US010430451B2

(12) United States Patent
Rota

(10) Patent No.: US 10,430,451 B2
(45) Date of Patent: Oct. 1, 2019

(54) SYSTEM AND METHOD FOR AGGREGATING AND SHARING ACCUMULATED INFORMATION

(71) Applicant: Arie Rota, Bat Yam (IL)

(72) Inventor: Arie Rota, Bat Yam (IL)

(*) Notice: Subject to any disclaimer, the term of this patent is extended or adjusted under 35 U.S.C. 154(b) by 396 days.

(21) Appl. No.: 15/438,063

(22) Filed: Feb. 21, 2017

(65) Prior Publication Data

US 2017/0242921 A1   Aug. 24, 2017

Related U.S. Application Data

(60) Provisional application No. 62/297,963, filed on Feb. 22, 2016, provisional application No. 62/298,478, filed on Feb. 23, 2016.

(51) Int. Cl.
| | |
|---|---|
| G06F 7/00 | (2006.01) |
| G06F 17/30 | (2006.01) |
| G06F 16/35 | (2019.01) |
| G06F 16/31 | (2019.01) |
| G06F 16/36 | (2019.01) |

(52) U.S. Cl.
CPC .......... *G06F 16/353* (2019.01); *G06F 16/322* (2019.01); *G06F 16/35* (2019.01); *G06F 16/367* (2019.01)

(58) Field of Classification Search
None
See application file for complete search history.

(56) References Cited

U.S. PATENT DOCUMENTS

| | | | | |
|---|---|---|---|---|
| 6,564,210 | B1* | 5/2003 | Korda | G06F 16/00 |
| 6,981,040 | B1* | 12/2005 | Konig | H04L 67/20 |
| 8,762,368 | B1* | 6/2014 | Duddu | G06F 16/353 |
| | | | | 707/722 |
| 2011/0099201 | A1* | 4/2011 | Shen | G06Q 30/0631 |
| | | | | 707/771 |
| 2011/0295776 | A1* | 12/2011 | Donato | G06N 7/005 |
| | | | | 706/12 |
| 2013/0204869 | A1* | 8/2013 | Gabrilovich | G06F 16/35 |
| | | | | 707/728 |
| 2014/0244551 | A1* | 8/2014 | Aoki | G06N 20/00 |
| | | | | 706/12 |
| 2016/0034757 | A1* | 2/2016 | Chhichhia | G06K 9/00469 |
| | | | | 382/206 |

* cited by examiner

*Primary Examiner* — Tuan A Pham
(74) *Attorney, Agent, or Firm* — Buckley, Maschoff & Talwalkar LLC

(57) ABSTRACT

An accumulated information data store may include topic nodes, each having a text description of limited length and (in some cases) one or more attributes. A particular topic node may be associated as a parent topic node other child topic nodes such that the topic nodes form at least one data tree. An information processing engine may access information in the accumulated information data store and determine that a plurality of topic node text descriptions are similar and classify them as similar topic nodes. At least a part of the text description associated with one of the similar topic nodes may be selected as a favorable text description for the similar topic nodes. The system may also unify the similar topic nodes as identical topic nodes when they are currently grouped together as having the same upper tree hierarchy.

19 Claims, 21 Drawing Sheets

FIG. 11B

| TOPIC NODE IDENTIFIER 1902 | TEXT DESCRIPTION 1904 | RATING 1906 | CHILDREN 1908 | UNIFIED NODES 1910 | SIMILAR NODES 1912 | PARENT NODE 1914 | AVERAGED DESCRIPTIONS 1916 | SPHERES/ GROUPS 1918 |
|---|---|---|---|---|---|---|---|---|
| TN_Z | ADVANTAGES OF COMPETITIVENESS IN SPORT | NONE | ZC, ZB | ABC | NONE | NONE | NONE | GENERIC |
| TN_ZB | IT MAKES PEOPLE MORE AMBITIOUS IN REAL LIFE | 5 | ZBD, ZBC | ABCX | ABCX, ACE | Z | NONE | GENERIC |
| TN_ABC | ADVANTAGES | NONE | ABCZ, ABCX | Z | NONE | AB | NONE | SPORT |
| TN_ABCX | I THINK IT MAKES ME MORE AMBITIOUS IN REAL LIFE | 3 | NONE | NONE | ZB, ACE | ABC | NONE | SPORT |
| TN_ZC | LOSS OF WEIGHT IS ACHIEVED EASIER WITH SPORT PRACTICED 4 TIMES PER WEEK | 3 | ZCE | NONE | AC | Z | 4 TIMES PER WEEK, INTENSITY = "LOW", WORKOUT = "60 MINUTES" | GENERIC |

SYSTEM AND METHOD FOR AGGREGATING AND SHARING ACCUMULATED INFORMATION

The present application claims the benefit of U.S. Provisional Patent Application No. 62/297,963 entitled "SYSTEM AND METHOD FOR AGGREGATING AND FOR SHARING DATA BASED ON CROWD ACCUMULATED WISDOM" filed on Feb. 22, 2016 and of U.S. Provisional Patent Application No. 62/298,478 entitled "SYSTEM AND METHOD FOR AGGREGATING AND FOR SHARING DATA BASED ON CROWD ACCUMULATED WISDOM" filed on Feb. 23, 2016. The entire contents of those applications are incorporated herein by reference.

BACKGROUND

The Internet can facilitate an exchange of information between individuals and groups of individuals. For many people, the Internet represents a principal way by which they gather information from other people about many different topics. Moreover, people may use the Internet to share their own information and opinions with other people. The result may be a complex array of intersecting and non-intersecting information about a substantial number of topics between vast numbers of individuals. Navigating and viewing such a large, inter-related set of information can be a difficult, confusing, and time-consuming task.

It would therefore be desirable to aggregate and share accumulated information in an automatic and accurate manner.

SUMMARY

According to some embodiments, an accumulated information data store may include a plurality of topic nodes, each topic node having a text description of limited length and at least some of the topic nodes being associated with one or more attributes. In some cases, a particular topic node may be associated as a parent topic node to one or more other child topic nodes such that the topic nodes in the accumulated information data store form at least one data tree. An information processing engine may access information in the accumulated information data store and determine that a plurality of topic node text descriptions are similar and classifying them as similar topic nodes. At least part of the text description associated with one of the similar topic nodes may be selected as a favorable text description for the similar topic nodes. The system may automatically identify all other topic nodes in the accumulated information data store that have the same text description as one of the similar topic nodes and merge all of the other identified topic nodes with the similar topic nodes, wherein the similar topic nodes and all of the other identified topic nodes are now classified as similar to each other and retain their associated attributes. The system may also unify the similar topic nodes as identical topic nodes when they are currently grouped together as having the same upper tree hierarchy. The system may classify the unified topic nodes that are also similar topic nodes as a single topic node represented by the favorable text description, wherein any attribute associated with the unified topic nodes is automatically mathematically combined.

Some embodiments comprise: means for storing, in an accumulated information data store, a plurality of topic nodes, each topic node having a text description of limited length and at least some of the topic nodes being associated with one or more attributes, wherein a particular topic node is associated as a parent topic node to one or more other child topic nodes such that the topic nodes in the accumulated information data store form at least one data tree; means for accessing, by an information processing engine, information in the accumulated information data store; means for determining, by the information processing engine, that a plurality of topic node text descriptions are similar and classifying them as similar topic nodes; means for selecting at least part of the text description associated with one of the similar topic nodes as a favorable text description for the similar topic nodes; means for automatically identifying all other topic nodes in the accumulated information data store that have the same text description as one of the similar topic nodes and merging all of the other identified topic nodes with the similar topic nodes, wherein the similar topic nodes and all of the other identified topic nodes are now classified as similar to each other and retain their associated attributes; means for unifying the similar topic nodes as identical topic nodes when they are currently grouped together as having the same upper tree hierarchy; and means for classifying the unified topic nodes that are also similar topic nodes as a single topic node represented by the favorable text description, wherein any attribute associated with the unified topic nodes is automatically mathematically combined.

Some technical advantages of some embodiments disclosed herein are improved systems and methods to aggregate and share accumulated information in an automatic and accurate manner.

BRIEF DESCRIPTION OF THE DRAWINGS

FIGS. 11A and 11B show an illustrative embodiment of a personal diary belonging to a specific topic, under a specific hierarchy, in accordance with some embodiments.

FIG. 19 is a tabular portion of a monitoring node database according to some embodiments.

DETAILED DESCRIPTION

Figure 1A:
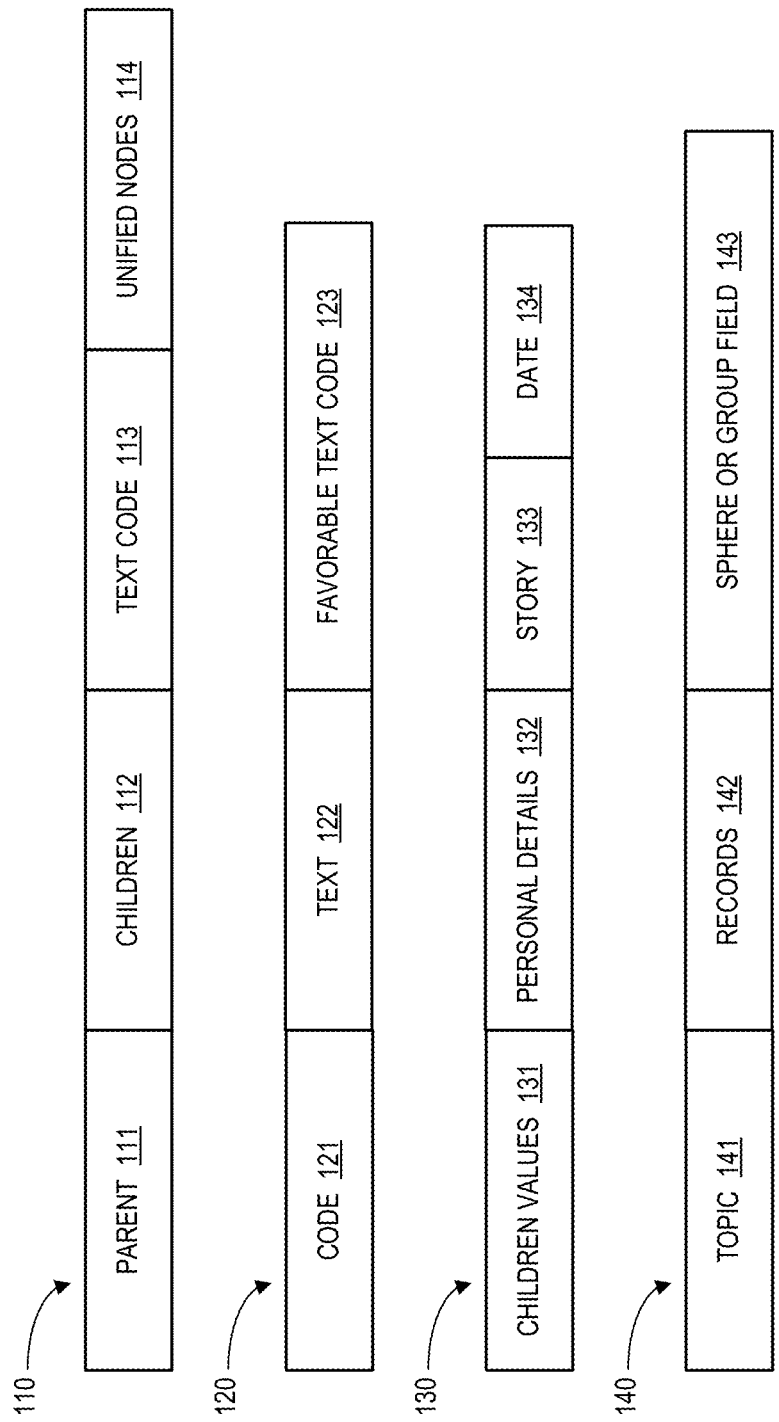
FIGS. 1A and 1B show data structures for implementing a system to aggregate and share accumulated information in accordance with some embodiments.

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Some embodiments described herein provide anonymous and/or identified users' with a dynamic system for aggregating and presenting information. The information may be continuously collected from users and may be organized in brief textual topics. Moreover, associated data may be collected and stored as child topics. As used herein, the term "topic" may refer to, for example, a node in a tree that represents a certain textual data and that may (or might not) have child topics or nodes. A child of a topic may also include textual data which is related to the text of the parent topic, and these texts may be inserted by a user. A child of a topic may also function as a topic itself, and have other related child topics, creating a branched tree.

According to some embodiments, the system is divided into one or more spheres of knowledge and/or groups of users, each with their own restrictions and/or preloaded data, in a hierarchy-based arrangement of the spheres and groups. A user may influence the information in an interactive way, such as by editing, removing, and/or amending topics. A user may also classify information by attaching or linking text together indicating that the topics are similar or identical in the system. A user may also interactively rate which text he or she agrees with, and which text is the most important for a topic. This rate value may be part of a description fields' values attached to each topic. An example for this layout maybe a sphere of "Health" including the topic "Hand" and below it a child topic "Elbow" and below that a line of children until the final topic is: "Radial head fracture"→"Actions"→"Exercising physiotherapy." The last child may have a rating of "Agreed and very important" and a description value of "Avg. repetition=Every 5 hours." According to some embodiments, a user may create his or her own diary for a topic when writing in data. The diary may include, for example, child topics and free text. The diary may include data that is inserted and updated by the user at different times, or in different stages, as different records. Utilizing these updates in the diary for calculations purposes might make the exhibited data in the system more reliable. The operation of identifying similar topics may be performed after comparing several topics in the same or different hierarchy levels of the trees, relating to the meaning of their text without relating to the context (parent topics). If the meaning of the text is similar then one of the topics' text also represents the other topics, for presentation purposes, and it is identified as the favorable topic. The favorable topic may then be displayed when presenting the data (instead of the other topics' text).

For example, topics with the text "the power is in our hands," "the power relies in our hand," and "we have the power" may be similar, while a topic "the power of the hand" is not similar to them. The rules for similarity may be plural/singular, male/female, etc. The rules for non-similar topics might be associated with different text meaning, maybe because of new data being added or being more specific. Searching may be performed according to text that is input by the user (or in other ways) and may take into account results of searches in similar topics. Thus, a search of a certain text can result in topics with another text that has a similar meaning. A search may also take into account the text of parent topics in the hierarchy tree line.

A "unifying" operation for identical topics, as opposed to the merging operation for similar text, may unify topics in which the combination of their texts and the texts that is generated from the hierarchy (line of parent topics) of each respective topic have equal meaning. For example: a child topic "advantages" under the hierarchy of "competiveness" which is child of "characteristic of sport" at the head of the tree line, might be unified with the topic "advantages of competiveness in sport" at the head of the tree line, because they are identical topics. In order for the unifying action to happen upon similar topics, there needs to be identical parents. If the parent is not the same parent, then the parents should be unified. In other cases, a similar topics' line should be similar in every respective node until one common parent (or several unified parents) is found or until the first parent topics in each of the hierarchy lines is reached. The unifying operation may cause an automatic averaging of their rating values. The averaging may, for example, generate a new set of averaged values for each topic of the unified topics along with its own values. Their child topics may also be coupled—thus providing the option, when viewing a certain unified topic as the main presented topic, to review the coupled child topics of all of its' unified topics. Child topics that are now coupled (and were similar previously to the coupling operation) may become unified, and their child topics may also become coupled. The same rule would apply for them until the bottom of each tree line is reached.

The unifying and the identification of similar topics may provide three levels for viewing and averaging the data: (1) viewing a specific presented topic, which has one specific hierarchy above it, and the unique data linked to it, meaning only its own child topics; (2) viewing the level of unified averaged presented topic-meaning all of the coupled child topics of the topics that are unified with the presented topic; and (3) viewing the level of similar topics to the presented topic which will include the child topics of both the levels above, and also the coupling with child topics of the similar topics to the presented topic.

The viewing and averaging of the data as result of the unifying may also take into account the hierarchically arranged topics and groups and spheres of information. Each topic may be displayed and averaged with the unified topics that are included in the same or lower (more specific) group or sphere level. The lower level may be a group or a sphere wherein the "General" sphere is at the top position and includes averaging and displaying of all the spheres/groups below it, calculating all the values of its lower more specific layers. For example, if a user belongs to a certain group he or she will see only its data and the data of the lower groups. If a user selects a certain sphere/group he or she will see its data and the data of spheres/groups within it only (which are at a lower level to it).

Consider, for example, the sub-trees:

Generic→Health→XXX Hospital

Generic→High-Tech group

In this case, topics that are fed to the "XXX hospital" are part of the "Health" and of "Generic" including their children. The topics may be changed as part of "Generic" but these changes will be averaged within "Generic" alone. More specific sphere/group such as "Health" might not be affected.

According to some embodiments, spheres may be affected by default in the ratings but not in favorable text. Groups might not be affected by default in ratings, but only if the user decides that he or she wants this action to happen. Thus, changes in a higher sphere, such as the general sphere, may affect the lower, more specific, sphere in some cases (and will not affect the lower sphere in other cases, depending on user selection). Note that a first sphere might, or might not, share information with a second sphere.

When viewing children of a topic there may be an option to view the most directly related topics and the least related topics. For example the topic "Leg" (which is within the sphere "Health") may include the child topic "Knee" which includes its child topic "Broken knee" which includes a child topic "Broken knee treatment." The results of the presentation of "Leg" may be child topics of "Leg" including "Knee," or "Knee" and "Broken knee," or "Knee," "Broken knee," "Broken knee treatment."

Choosing the furthest related level for the presented topic may result in presentation of a lot of child topics of different relation level to the presented topic. In case similar topics exist among those child topics, they may be unified and averaged temporarily for the current presentation. This procedure may occur in any situation when similar, but not identical, child topics are presented or calculated together. Such an approach may thus make the system, in this enlarged state, temporarily more concise and less repetitive (but potentially also temporarily less credible) based on the user's preference.

By default, the presentation and calculation of child topics may be provided according to a summary of the favorable unified topic's direct children for the current sphere or group. To change the default calculation and presentation, the parameters that are used may include: an identical topics selection field, a groups and spheres selection field, and/or a hierarchy relation selection field. The system may aggregate all of the information for each topic, showing the most relevant child topics first with their rate of importance, calculating these results in various ways that may include, for example: Joining or excluding different spheres or groups; and/or calculating weight of certain topics according to rates of users that are associated with these topics. Such rates might be associated with, for example, a level of importance, a popularity, and/or a contemporary date. Other types of calculations might include filtering the presentation of the data according to personal filters; allowing the identifying of similar topics by the user or by the system and selecting of only one topic from the similar topics such that only the selected topic is displayed to users; and/or unifying data of two or more topics that have similar hierarchies (parent topics) and may be considered identical; and/or combining child topics that are at a lower level tree branch of the topic as being direct child topics of the topic. The system may thus aggregate data and allow the summarizing of specific knowledge of a specific topic (and allow a user to share his or her knowledge knowing that the knowledge is summarized and filtered by other users). The aggregation may, according to some embodiments, take into account alone or more of the following parameters: Joining or excluding different spheres or groups; calculating weight of certain topics according to rates of users that are associated with these topics; such rates may be level of importance, popularity, or contemporary date, some or all together; filtering by personal data of the user; identifying similar topics and presenting them as one topic; averaging values of identical topics; combining child topics that are at a lower level tree branch of the topic as being direct child topics of the topic.

Thus, embodiments may provide an engine that presents to a user data that is more relevant to his or her preferences while reducing the repetition of information while still summarizing relevant information.

Figure 1B:
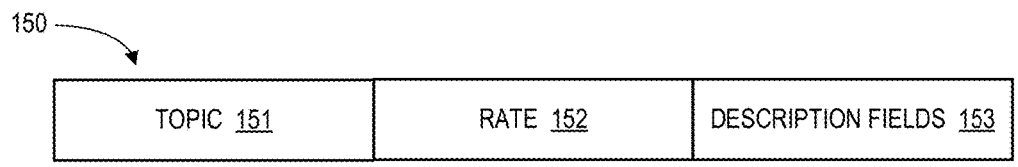

FIGS. 1A and 1B show exemplary data structures for implementing a system according to some embodiments. An electronic record or table 110 is configured for storing data related to a topic. The term "topic" may refer to, for example, a node in a tree that includes text representing a certain topic. A topic may be a child of another topic and a topic may have children. The topics enable easy navigation and also assist in searching the relevant data by identifying two or more similar topics. The topics may be created by the user or may be predefined by the system. The topic table 110 includes a parent field 111, a children field 112, a text code field 113, and a unified nodes field 114. The parent field 111 includes a link to the parent of the topic in the tree that represents the data. The parent may be another topic. If the topic 110 is the head of the tree, then the parent field 111 is empty. The children field 112 includes a list of the children of the topic 110. These children are topics themselves. If the topic 110 has no children, the list is empty. The text code field 113 includes code from a text table 120 that represents the text of this topic. The unified nodes field 114 includes list of links to other topics that have been selected by users of the system as unified or have been identified by the system as unified. For example, unified nodes may be associated with situations where all of the texts of the topics comprising the specific topic represented in table 110 (meaning the parent's line) appear in the unified topic's hierarchies (meaning the ones comprising each of their parent lines) in one way or another preserving the same whole meaning (without omitting, adding, or changing any significant data). The unified topics may be identical to the represented topic in terms of the textual meaning as a whole, taking into account the affiliation deriving from the topic's parent line (in other words, the hierarchy as a whole is identical, but not essentially in exactly the same order). In presentation, the level of unified causes the presentation of all of the unified topics' children and respectively their summarized calculated values, as if they were the represented topic's children. For example, assume topic A with parent B and above it parent C and above it Z, wherein B is a topic with text b and C is a topic with text c. Now assume topic W with parent X and above it Y and above it Z, wherein X is a topic with text that has now been identified as similar to b and Y is a topic with text that has now been identified as similar to c. Nodes C and Y may become unified because those nodes have the same parent, and nodes B and W become unified because those nodes have unified parents. The child topics A and W may become coupled and may be shown together when presenting topic B (or can be selected as unified topics if they have similar text since they have similar hierarchies). If the unified nodes field 114 is not empty, then the system may display all of the children of the unified nodes 114 in addition to the children of topic 110 and vice versa. Such unifying enables the system to summarize to the user all the data related to a certain topic. A table 120 is configured for storing texts and associated codes. The table 120 includes a code field 121, a text field 122 and a favorable text code 123. The text field 122 includes a text that is associated with the code field 121. The text may be entered by a user or may be predefined. A specific text is associated with a single code and cannot be associated with more than one code. The favorable text code 123 includes a link to the favorable topic's text. This text has been identified by the user or the system as similar to the text of topic 110 in field 122 and has been chosen by the user or the system to be displayed instead of the text in field 122.

If the favorable text code 123 of the topic 110 is not empty, the system may display the text of the similar topic which was set as favorable instead of the text of this topic. Every text description that was identified as similar to another text description is kept in table 120, creating a dictionary of similar texts in the system, so that in any case other topics in the system have the same texts syntax as the ones defined as similar in the dictionary, they become automatically similar topics. Other dictionary comparisons may be based on combinations of similar texts, in a way that parts of the text of a topic is defined as similar in the dictionary to parts of the text of another topic to automatically identify similarity between topics. This dictionary comparisons process applies also to future topics in the system, and all existing topics in the system. Note that specific information spheres, such as a user viewing his or her own diary (or specific spheres of knowledge and groups of people) might keep their own text similarities dictionaries without being affected by outside favorable text in the system. If the favorable text code field 123 of the topic 110 is empty, the system displays the text of the topic 110. If the favorable text code field 123 and the code field 121 are the same then topic 110 is the favorable topic of its similar topics. A record table 130 is configured for recording the operation of a specific user on a specific session. The session may be identified by a topic and by date. The record table 130 includes a children values field 131, a personal details field 132, a story field 133 and a date field 134. The children values field 131 includes a link to a list of children of this topic from a table 150 (see FIG. 1B) that are given a rate value by the user in this session and also the values of the children's description fields. The user personal details field 132 includes a link to a list of details about the user that are relevant to the session. The details may include name, religion, gender, etc.

The story field 133 includes free text that may be entered by the user and is related to this record. The date field 134 includes the date and time that this record was entered by the user. A diary table 140 may be configured for handling diary of a specific user with regard to his or her activities in the system related to a specific topic. The diary table 140 includes a topic field 141, a records field 142 and a sphere or group field 143. The topic field 141 includes a link to the topic to which this diary and all of its records refer to. A records field 142 includes a link to the list of records. The structure of the records is defined in the record table 130. The sphere or group field 143 includes the sphere or group to which this diary belongs. Examples of spheres are "Medical," "Sport," and "Art." The group may be a group of people. The children values table 150 is configured for storing the child topics and rates and the description fields' values of the child topics that are being filled by the user in a record. The table 150 includes a topic field 151, a rate field 152, and description fields' field 153. The topic field 151 includes a link to the child topic that is filled in with values by the user in relation to its parent topic 141. The rate field 152 includes the rate value which indicates how much the user agrees and values the text of the child topic 151 in relation with the parent topic 151. The description fields' field 153 includes a link to a list of description codes and their values that are used for averaging the description fields. The codes are connected to a certain description field type such as "repetition," and the value has a semantic attachment, such as "1=once, 2=every day, 3=twice a day, 4=all the time," etc.

According to some embodiments, when a topic is presented each user may rate the child topics which may include specific description fields' values according to relevancy. The rating may be used for displaying only topics having the highest rates to the user. In one embodiment, the system averages all of the ratings of the child topics of a certain topic regardless of their description fields. This may be calculated, for example, considering all of the records of a specific diary as one averaged rate for each child topic. The system may then average per each child topic a total average of all the users' diaries' averages. The rate for a child topic may be determined according to the total average and the number of diaries belonging to its parent topic. In other embodiments, different description fields' values and records dates may be taken into consideration when calculating the rates and presenting the most relevant child topic for a certain topic with its own specific values and not the averaged values of all the appearances.

Figure 2:
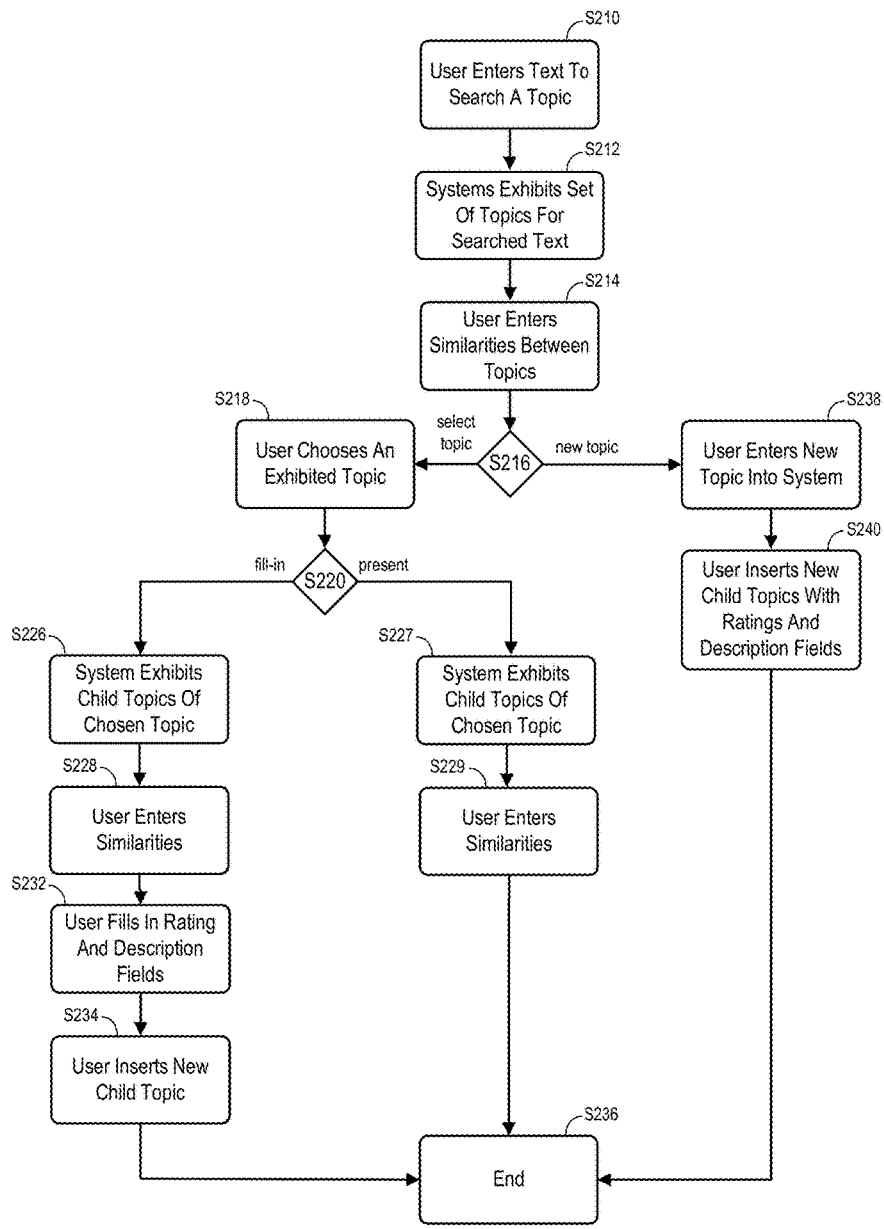
FIG. 2 is a method according to some embodiments.

For example, FIG. 2 illustrates a method of searching a topic, displaying data, and/or entering data that might be performed by some or all of the elements of the system described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a user may enter text in a searching screen in order to search a topic for displaying or updating. At S212, the system may exhibit a set of topics for the searched text according to a search priority algorithm. According to some embodiments, the search priority algorithm may consider giving more weigh to combinations of: topics from the same group of people that includes the user; topics from a certain pre-loaded sphere (which may be strict in its topic trees and therefore should be more dependable and well organized); topics form a "Generic" sphere which contains all data, but is dynamically built and unorganized; topics which have sematic text that resembles the semantics of the searched text; topics which were defined as similar in the system to the searched text; topics with a combination of first part of their text that resembles part of the searched text and the second part of their text which is defined as similar in the system to the remaining text of the searched text; topics that with the combination of their text and the text of their line of parent topics resembles the searched text or is defined as similar to it (or part of it) in the system; and/or topics that have more popularity, higher rating, contemporary date, previous users' selections for this searched text etc.

At S214, the user may point out similarity between exhibited topics. If the user pointed out similarity, then the system learns the suggestion of similarity, and decides later on if to define the topics as similar based on statistical comparisons. If so, the text of one of them will represent the others. For example, when exhibiting two similar child topics of one topic only one of them may be shown with the favorable text between them both. Note that the system may record the information provided by the user in S214. For example, the system may later use that information to make a suggestion to the user (e.g., based on his or her past selections) or to other users+.

If a selection of topic is chosen by the user at S216, he or she chooses one of the topics that were exhibited at S218. If a fill-in of data is chosen by the user at S220, the system may then exhibit the child topics of the chosen topic at S226. At S228, the user may point out similarity between the child topics which are connected to the topic he or she selected (and the system may learn the similarity). Note that the system might record the information provided by the user in S218 and/or S228. For example, the system may later use that information to make a suggestion to the user (e.g., based on his or her past selections) or to other users (e.g., if many users make the same selection, it might appear higher in a list of ranked choices). The user may fill in his or her rating and other deception field values that are connected to the child topics at S232. The user may also insert a new child topic for the chosen topic at S234 (that is, the system may learn about appropriate ratings, values, and new child topics) and the process may end at S236.

If a presentation of data is chosen by the user at S220, the system may then exhibit the child topics of the chosen topic at S227. At S229, the user may point out similarity between the child topics which are connected to the topic he or she selected (and the system may learn the similarity). Note that the system may record the information provided by the user in S229. For example, the system may later use that information to make a suggestion to the user (e.g., based on his or her past selections) or to other users.

If the user selects to enter a new topic at S216, he or she enters a new topic into the system at S238. In this case, there are no child topics to be exhibited, but instead new child topics are inserted by the user, with ratings and description fields' values. After the new child topics are inserted with ratings and description fields at S240. The system may then learn about appropriate ratings, values, and new child topics, and the process may then end at S236.

Figure 3:
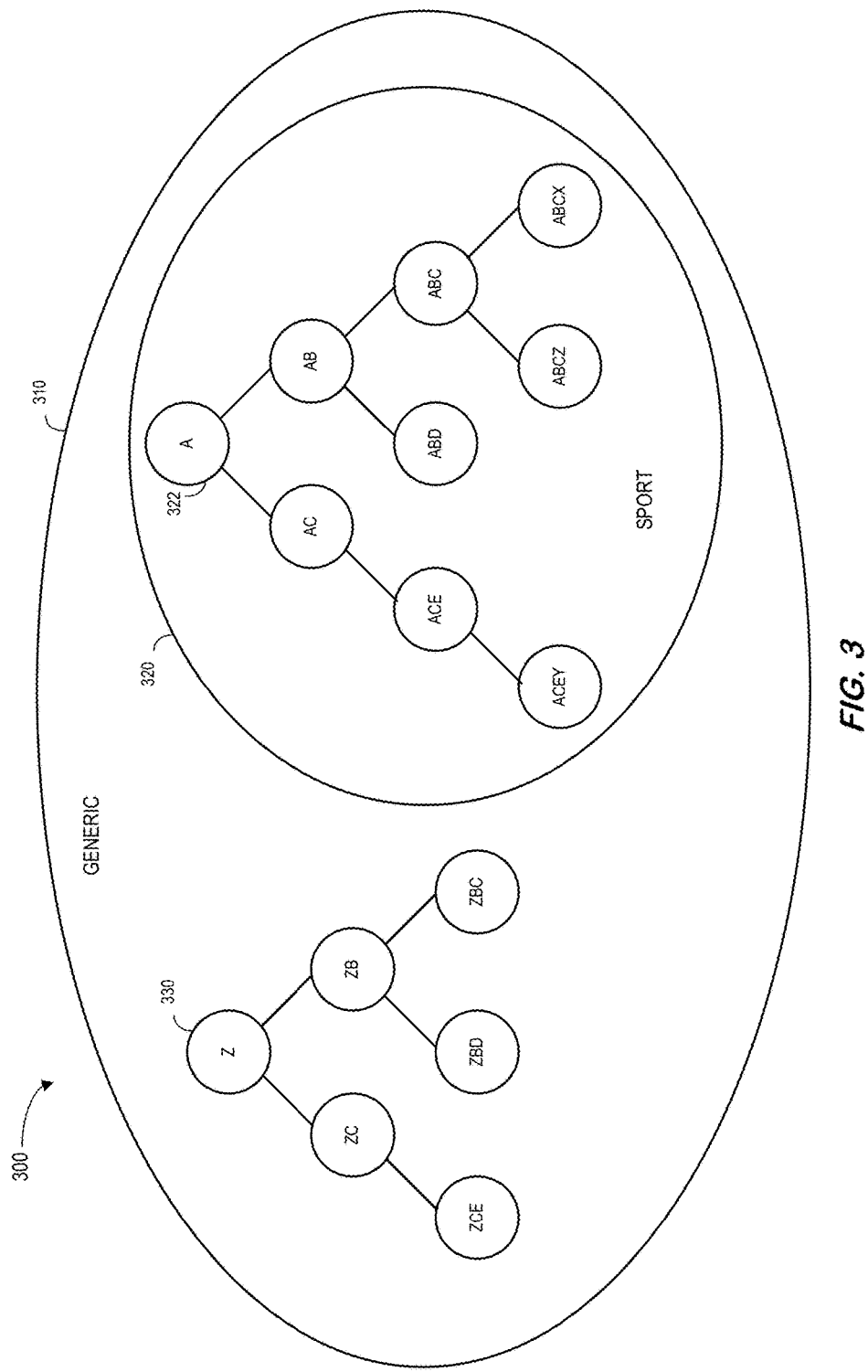
FIG. 3 illustrates two spheres of knowledge hierarchically arranged in accordance with some embodiments.

FIG. 3 illustrates 300 two spheres of knowledge hierarchically arranged in accordance with some embodiments. In particular, a generic sphere 310 may contain all of the information while a sport sphere 320 may represent a sphere of information within the generic sphere 310. The sport sphere 320 may comprise a hierarchy of topic nodes arranged into one or more data trees like the tree 322. In particular, the sport sphere 320 includes the following topic nodes and associated text descriptions (and, where applicable, rating score):

A—"Characteristic of sport"
AB—"Competiveness"
ABC—"Advantages"
ABCX—"I think it makes me more ambitious in real life" (rating=3)
ABCZ—"I feel my physical fitness has improved" (rating=4)
ABD—"Disadvantages"
AC—"I lose weight easier when I exercise sport 2 times every week" (rating=5; description field—intensity="extreme"; description field—workout="30 minutes")
ACE—"I think it makes me more ambitious in real life" (rating=1)

FIG. 3 further includes another tree hierarchy 330 within the generic sphere 310 containing the following topic nodes and associated text descriptions (and, where applicable, rating score):

Z—"Advantages of competiveness in sport"
ZB—"It makes people more ambitious in real life" (rating=5)
ZC—"Loss of weight is achieved easier with sport practiced 4 times per week" (rating=3; description field—intensity="low"; description field—workout="60 minutes")

The system may manipulate the multiple trees 322, 330, keeping them in their original settings but also connecting between them when appropriate, for summarization and aggregation purposes.

Note that a topic node might be associated with a "rating" and/or a "description" (or several descriptions). As used herein, the term "rating" might refer to a numerical value that indicates a relative importance of a topic node (e.g., a value from 1 through 5). The term "description" or "description fields" might include other information that describes something about the topic node. For example, a topic node might include an "Intensity" description with the following possible levels: "low," "medium," or "extreme." According to some embodiments, the levels within a description might be combined or averaged in some situations. For example, a description of "low" and a description of "extreme" might be averaged to a description of "medium."

In the example of FIG. 3, the two trees 322, 330 have nodes A and Z at the tree tops. Consider now a user who wants to connect tree nodes (topics) in a presentation of data. Initially, a current sphere of the system may be set to is "Generic," and so the two trees 322, 330 are shown as if they were on the same level of group/sphere (that is, the user can't tell the difference between them).

Figure 4:
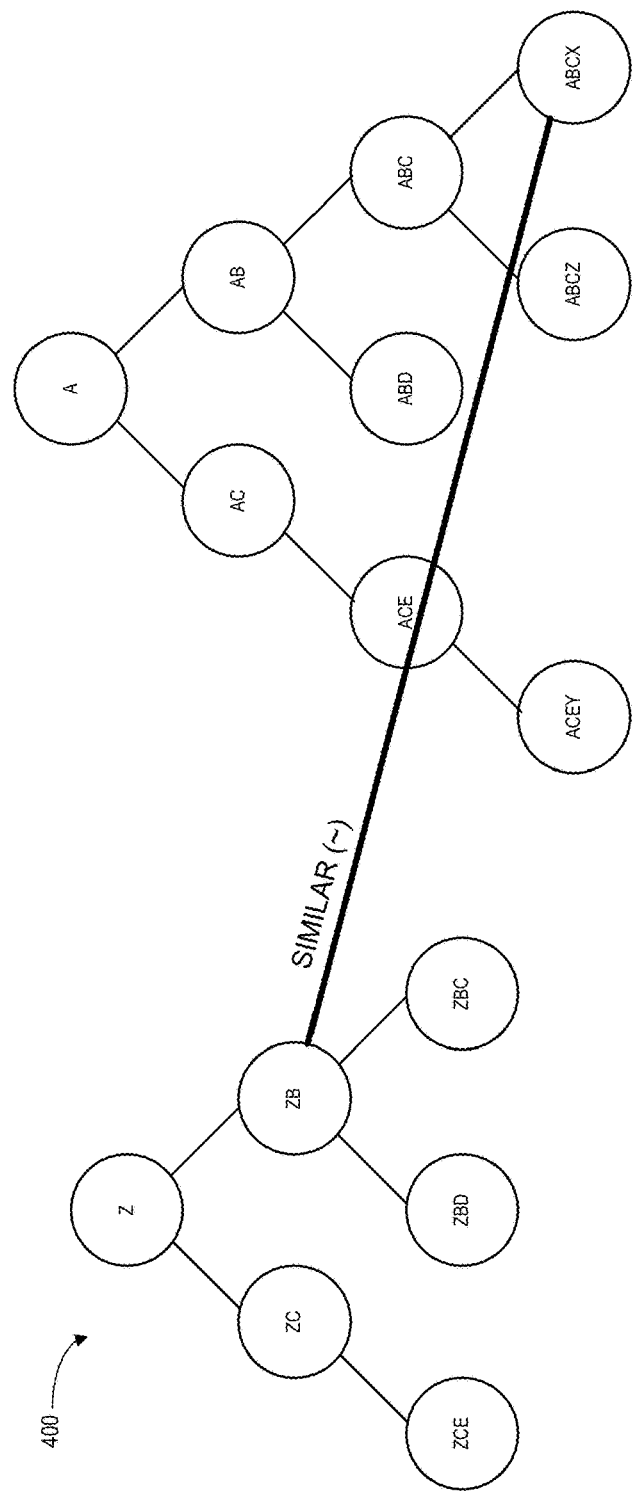
FIG. 4 is an example of merging similar topic nodes according to some embodiments.

FIG. 4 is an example 400 of merging similar topic nodes according to some embodiments. In particular, some users (or an automatic process) may point out a similarity (for a merge action) between ABCX and ZB, as illustrated by the bold line labeled "~" in FIG. 4. The system may, for example, decide if these two nodes are truly similar using statistical comparisons. If the two nodes are declared similar, then a favorable or representative text is selected between them. In this example, assume that the text of ZB has been selected as being the favorable one. The system which is set to the "Generic" sphere will now present them both with the same text of ZB while their respective rating values (and other description fields values if they exist) remain the same: (ABCX~ZB) (with the underlined node label representing the favorable text). Thus, when the system presents (or displays) the connected nodes while exhibiting topic "ABC" Table I will be provided:

TABLE I

| Main presented Topic | ABC | Advantages | Rating |
|---|---|---|---|
| Child topics | ABCX represented by the text of ZB | It makes people more ambitious in real life | 3 |
| | ABCZ | I feel my physical fitness has improved | 4 |

Figure 5:
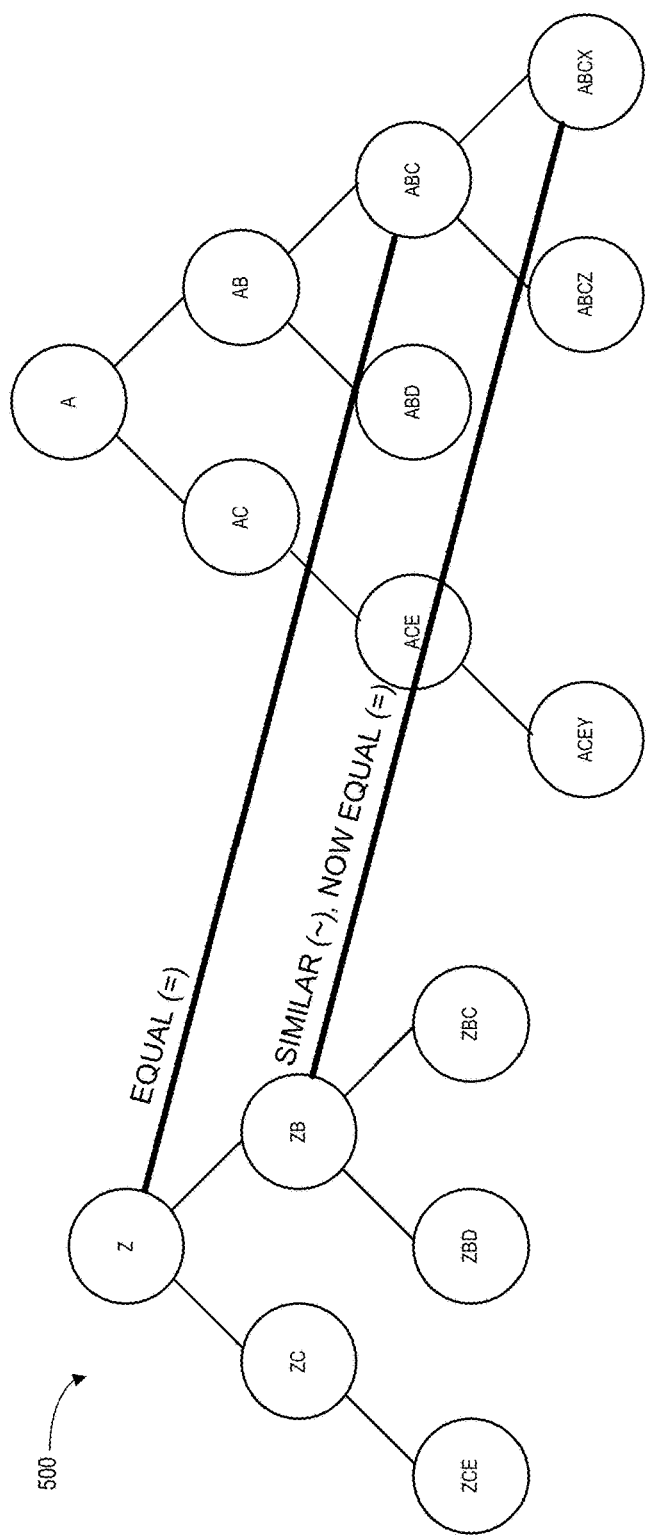
FIG. 5 is an example of unifying identical topic nodes in accordance with some embodiments.

FIG. 5 is an example 500 of unifying identical topic nodes in accordance with some embodiments. In this example, some users (or an automatic process) point out that Z and ABC are identical (unification action) as illustrated by the bold line labeled "=" in FIG. 5. The system may decide, for example, if the two nodes should truly be unified as identical using statistical comparisons. If the two nodes are declared as unified, then they are unified. As a result, if they are categories (that is, a child topic with a rating) then their ratings are averaged together, and if they have description fields they are also averaged: (ABC=Z). As a result of this unification, the children of these topics are coupled and the children that were similar before the unification process also become unified. Thus, in this example, ABCX and ZB become unified as illustrated by the label "Similar (~), Now Equal (=)" in FIG. 5. Note that this process may also occur upon the children of ABCX and ZB who were similar, until the bottom of each tree is reached:

ABCX~ZB+ABC=Z→(ABCX~=ZB)

A not~Z, AB not~Z, ABC not~Z (because of missing semantic data between them)

Thus, when the system presents (or displays) the connected nodes while exhibiting topic "Z" Table II will be provided:

TABLE II

| Main presented Topic | Z | Advantages of competiveness in sport | Rating | Description fields |
|---|---|---|---|---|
| Child topics | ZB (averaged rating with ABCX) | It makes people more ambitious in real life | 4 | |
| | ABCZ | I feel my physical fitness has improved | 4 | |
| | ZC | Loss of weight is achieved easier with sport practiced 4 time per week | 3 | intensity = "low" workout = "60 minutes" |

And after the last unification when exhibiting topic ABC, Table III will be provided:

TABLE III

| Main presented Topic | ABC | Advantages | Rating | Description fields |
|---|---|---|---|---|
| Child topics | ABCX represented by the text of ZB, now averaged with ZB. | It makes people more ambitious in real life | 4 | |
| | ABCZ | I feel my physical fitness has improved | 4 | |
| | ZC | Loss of weight is achieved easier with sport practiced 4 times per week | 3 | intensity = "low" workout = "60 minutes" |

Figure 6:
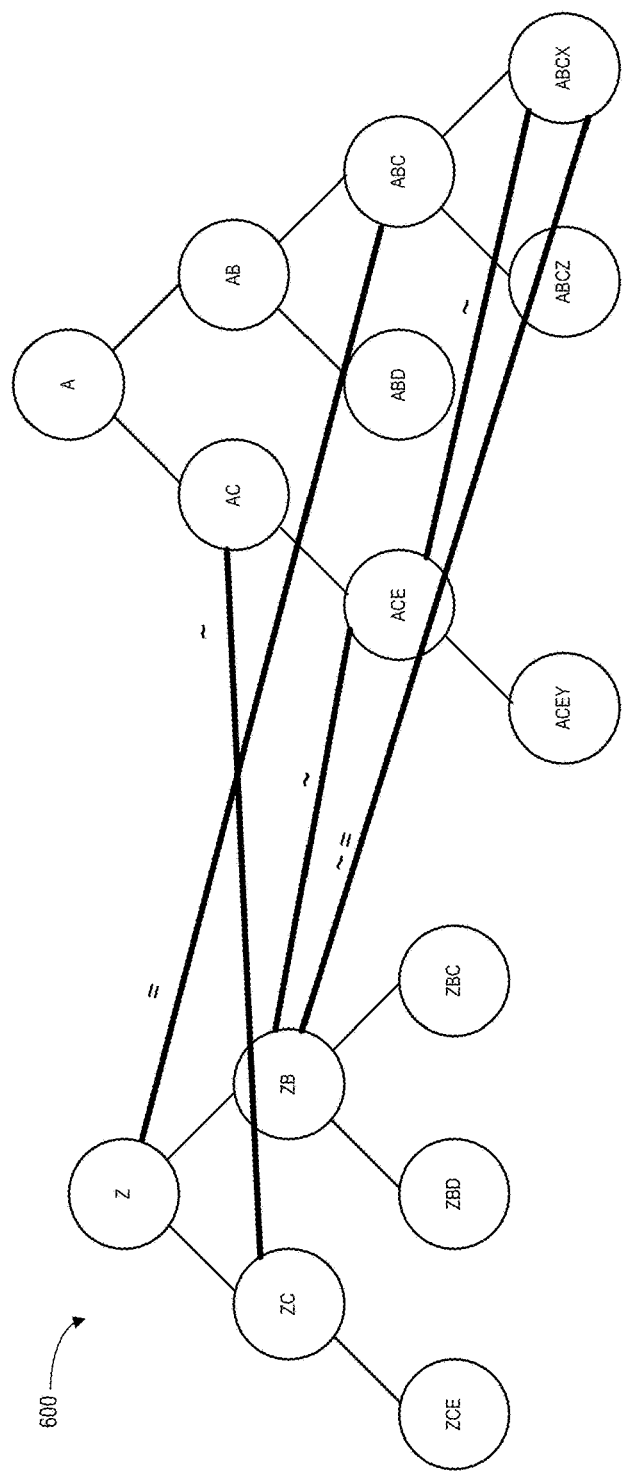
FIG. 6 is another example of merging similar topic nodes according to some embodiments.

According to some embodiments, a dynamic presentation and aggregation of information may be provided through three selection fields (sometimes referred to as "constriction fields"). For example, by decision of the user or the system, a presentation of the main presented topic may contain an enlarged view of child topics beyond the default rule of "direct children of all the unified topics with the main presented topic, in the current group/sphere." Note that each time similar topics are presented as child topics of a topic they will be summarized temporarily for the presentation. For example, FIG. 6 is another example 600 of merging similar topic nodes according to some embodiments. As before, (ABCX~=ZB) and (ABC=Z). In this example, another similarity was noticed: (AC~ZC) as illustrated by the bold line labeled "~" between those two nodes in FIG. 6 and also ABCX is automatically identified as similar to ACE because of text similarity (to the point of being exactly the same text). As a result, ACE~ABCX~=ZB.

According to some embodiments, an identical topics selection field (sometimes referred to as a "singularity selection field") may be used to present data in three different ways: (1) "Specific Presented Topic"; (2) "Identical Topics" (which might be the default setting); and (3) "Similar Topics."

In the case of "Specific Presented Topic" (sometime referred to as "Unique Topic"), when the main presented topic is node Z, the children presented will be: ZB (rated without ABCX=5) and ZC (rated=3; intensity="low," workout="60 minutes).

In the case of "Identical Topics" (sometimes referred to as "Unified Averaged Presented Topic"), when the main presented topic is node Z, the children presented will be: ZB (with an average rated with ABCX=4), ABCZ (rated=4), and ZC (rated=3; intensity="low," workout="60 minutes")

In the case of "Similar Topics" (sometimes referred to as "Equivalent By Text Only"), when the main presented topic is node Z, the children presented will be: ZB (with an average rated with ABCX=4), ABCZ (rated=4), and ZC (rated=3, intensity="low," workout="60 minutes). When the main presented topic is node ZC, the children presented will be: ACE and ZCE. Furthermore, if ACE~ZCE, then the children presented will be: ACE (with an average rated with ACE and ZCE—similar nodes become summarized temporarily).

According to some embodiments, information may be presented in accordance with a hierarchy relation selection field in three different ways: (1) "Directly Related Topics" (which might be the default setting); (2) "Close Subordinates"; and (3) "Least Related Topics."

In the case of "Directly Related Topics" (sometimes referred to as "Direct Subordinates," "direct relation"), when the main presented topic is A, the children presented will be: AB, AC (represented by the text of ZC and the rating and description field values of AC).

In the case of "Close Subordinates" (sometimes referred to as "close relation"), a level of presentation may depend on the length and size of the tree, and show only a limited amount of child hierarchy under the presented topic. For example, if the main presented topic is A, the children presented will be: AB, AC (represented by the text of ZC and the rating and description field values of AC, ACE (represented by the text of ZC and the rating of ACE), ABD, and ABC.

In the case of "Least Related Topics" (sometimes referred to as "Distant Levels," "distant relation"), when the main presented topic is A, then Table IV will be provided:

TABLE IV

| Main presented Topic | A | Characteristic of Sport | Rating | Description fields |
|---|---|---|---|---|
| Child Topics | AB | Competiveness | | |
| | ABD | Disadvantages | | |
| | ABC | Advantages | | |
| | ABCZ | I feel my physical fitness has improved | 4 | |

TABLE IV-continued

| Main presented Topic | A | Characteristic of Sport | Rating | Description fields |
|---|---|---|---|---|
| | ABCX represented by the text of ZB, averaged with ZB and ACE. | It makes people more ambitious in real life | 3 | |
| | ZBC (child of Z = ABC) | | | |
| | ZBD (child of Z = ABC) | | | |
| | ZCE (child of Z = ABC) | | | |
| | AC (represented by the text of ZC. avg rate and avg description fields with ZC because children of Z are added) | Loss of weight is achieved easier with sport practiced 3 times per week | 4 | intensity = "moderate" workout = "45 minutes" |
| | ACEY | | | |

According to some embodiments, information may be provided in accordance with a group and sphere selection field which are arranged hierarchically, a change in this setting will change the default of "Generic" sphere 310 which existed in this example until now.

In the case of "Generic" sphere 310 (the top level presentation of all data), when the main presented topic is ABC, the children presented will be: ABCX (represented by the text of ZB, and average rated with ZB=4), ABCZ (rated=4), and ZC (rated=3, intensity="low," workout="60 minutes").

In the case of "Sport" sphere 320 (the more specific lower level), when the main presented topic is ABC, Table V will be provided:

TABLE V

| Main presented Topic | ABC | Advantages | Rating |
|---|---|---|---|
| Child Topics | ABCX represented by the text of ZB. without avg with ZB. | It makes people more ambitious in real life | 3 |
| | ABCZ | I feel my physical fitness has improved | 4 |

Note that favorable text might not cross spheres/groups according to some embodiments, but is only one illustrative approach. According to other embodiments, no text from a higher level would show up in a lower more specific level. An opposite role might apply for averaged rating which might be averaged between different spheres/groups according to some embodiments.

According to some embodiments, different selection fields/constrictions may be combined. Note that usually the system may be set to default settings associated with presentation of the main presented topic and child topics. These might be, for example, direct children of the unified topics within the current sphere/group. To get a larger perspective on a certain main presented topic, these settings can be changed to allow for the combination of changes to default settings in several selection fields/constrictions, making the multi-tree alignment act more like a graph (that is, flattening the hierarchy related to the main presented topic and connecting different trees by similarity). For example, when the main presented topic is ZC, the following settings: Sphere=Generic, Hierarchy=Least Related Topic, and Identical Topics=Similar Topics would result in Table VI being provided:

TABLE VI

| Main presented Topic | ZC | Loss of weight is achieved easier with sport practiced 4 times per week | Rating |
|---|---|---|---|
| Child topics | ZCE | | |
| | ACE (this is a child of AC which temporarily became summarized with ZC, represented by the text of ZB and the rating of ACE) | It makes people more ambitious in real life | 1 |
| | ACEY (Least Related Topics child of ZC) | | |

As will now be described, a system may be divided into one or more spheres of knowledge and/or groups of users, each with their own restrictions and/or preloaded data, in a hierarchy-based arrangement of the spheres and groups. Users may influence the information in an interactive way, such as by linking similar text together, interactively rating text they agree with (or disagree with), and/or indicating which topics are most important. A user may create his or her own diary for a topic when entering data, thus enabling modifying and updating of various categories. The system may aggregate all of the information for each topic, showing the most relevant categories first with their rate of importance, and calculate results in various ways, such as:

joining or excluding different spheres or groups, calculating weight of certain categories according to rates of users that are associated with these categories (such rates may be level of importance, popularity, and/or contemporary date), filtering the presentation of the data according to personal filters, allowing identification of similar topics or categories by the user or the system and the selecting of only one topic or category from the similar topics or similar categories such that only the selected favorable topic or category is displayed to users (if certain text is identified as similar to another text, the result of searching for the certain text may also show the text that is identified as similar), and/or joining or excluding the topic's own remotely related categories belonging to different levels of the same topic's extended hierarchy.

In this way, the system may provide an engine that presents to a user data that is more relevant to his or preferences while eliminating repetition of information and summarizing relevant information.

Various exemplary embodiments may represent systems and methods for the collecting, updating, rating, classifying, extraction, selection, searching, sorting, filtering, aggregating, displaying, and/or presenting of data in a variety of formats and media. Note that the textual information may be related to various topics collected from a substantial number of users, or specified groups of individuals, in the context of brief textual topics and categories layout, based on the knowledge of many people. The knowledge of the people may be calculated giving weight to certain terms that may include, for example:

Joining or excluding different spheres of knowledge that may be defined in advance with preloaded data in their hierarchy tree of knowledge/topics. Such an approach may take into account that every sphere may also be subjected to specific restrictions to the collection of data procedures (by ways that may include restrictions on new inserts, updates and rates). Examples may include no new topics, an only categories' rating mode, constant description fields etc. Spheres may also have no preloaded data, and/or no restrictions.

Joining or excluding different groups of individuals and their accumulated knowledge (authentication may be required). According to some embodiments, specific restrictions to the collection of data may be applied, similar to the spheres.

These spheres and groups and their exclusive associated data may be laid on a hierarchy based scale enabling the user to choose which level he would prefer the system to be temporarily adjusted for. For example, the level titled "Generic" (or the similar) means the general sphere, containing all the data from all the other spheres and groups.

Giving more weight to certain categories, and consequently priority in presentation, may be achieved via attributes that include user rates of importance for a topic, popularity by way of total rates count, contemporary date, etc.

Filters that consist of personal details related to a certain state, such as age and gender by default. Note that embodiments might use other characteristics according to the sphere or group that the listing is associated with (e.g., recovery level and therapy type for a health sphere of knowledge).

Joining or excluding similar topics and/or categories, changing them from singular to multiple, thus increasing or decreasing categories amount for a topic, calculation rates for the categories themselves, and other calculations.

These singularity levels may be on a scale enabling a user to choose which level is of interest, after selecting a topic for various actions. The singularity levels might include, for example:

i. A singular "Specific Presented Topic" (or a similar phrase) and its categories, that were filled under its unique text and specific hierarchy.

ii. A unified and summarized "Identical Topics" (or a similar phrase) level which means basically all of the topics comprising the specific topic, requiring the same specific hierarchy (not omitting or adding or changing any important data). In presentation, these are identical to the main topic presented in terms of the textual meaning as a whole, taking into account the affiliation (in other words, the hierarchy as a whole is identical, but not essentially in exactly the same order). This level may cause the presentation of all of the identical topics' categories and respectively their summarized calculated values, as if they were the main topic's categories.

iii. A merged "Similar and close" (or a similar phrase), which is a reduced version of the next level titled "Similar topics," joining only topics that have identical/similar or the same unique topic as one of their close parent topics in their hierarchies.

iv. A merged "Similar topics" level (or similar phrase), means joining topics that have similar text (not omitting or adding or changing any important data) but are not similar neither by affiliation nor hierarchy, and as a result, not the same specific topic. In presentation, this level can cause a large amount of categories to be presented and calculated, that aren't necessarily connected between them.

Joining or excluding the topic's own remotely related categories belonging to different levels of the same topic's extended hierarchy, subordinates of subordinates, etc.

These hierarchy relation levels are on a scale enabling the user to choose a level of interest (e.g., for the Directly Related Topics, meaning direct categories, or close subordinates, meaning the first few close levels to be calculated and presented as if they were Directly Related Topics, or Least Related Topics).

In all of the three level scales (spheres/groups, identical topics, hierarchy relation) one side of the scale serves as the more specific and bounded level while the other side serves as the more general level containing all of the data in the more specific levels. These may determine the general constrictions according to which the system is temporarily adjusted, influencing all of the data aggregated and displayed.

Further embodiments may be used for collecting, updating, rating, classifying, extraction, selection, searching, sorting, filtering, aggregating, displaying, and/or presenting data in a variety of formats and media the textual information related to various topics collected from a substantial number of users. This knowledge of the users may be calculated giving weight to certain terms elected by the user that correlates to each of the terms specified above.

Figure 7:
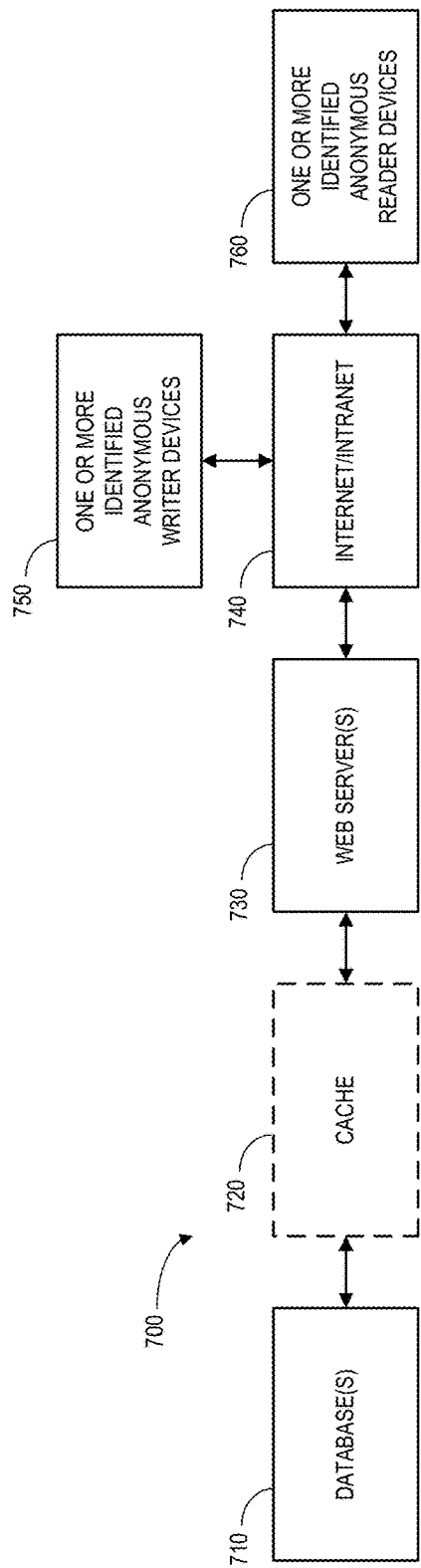
FIG. 7 is a block diagram of a system to aggregate and share data based on crowd accumulated wisdom in accordance with some embodiments.

FIG. 7 shows a block diagram system 700 for aggregating and sharing data based on accumulated knowledge in accordance with some embodiments of the disclosed subject matter. In particular, the system 700 may be used by one or more identified or anonymous individuals to extract knowledge, referred to as "readers" using reader devices 760 (e.g., computers, smartphones, etc.). The system 700 may also be used by one or more identified or anonymous users to fill-in or enter data, referred to as "writers" using writer devices 750 (e.g., computers, smartphones, etc.). These people 750, 760 are interactively networked via the Internet/Intranet 740 to one or more web servers 730 that are coupled to one or more databases 710. The system 700 may also include an optional cache memory 720 or similar feature between the one or more web servers 730 and the one or more databases 710.

Figure 8:
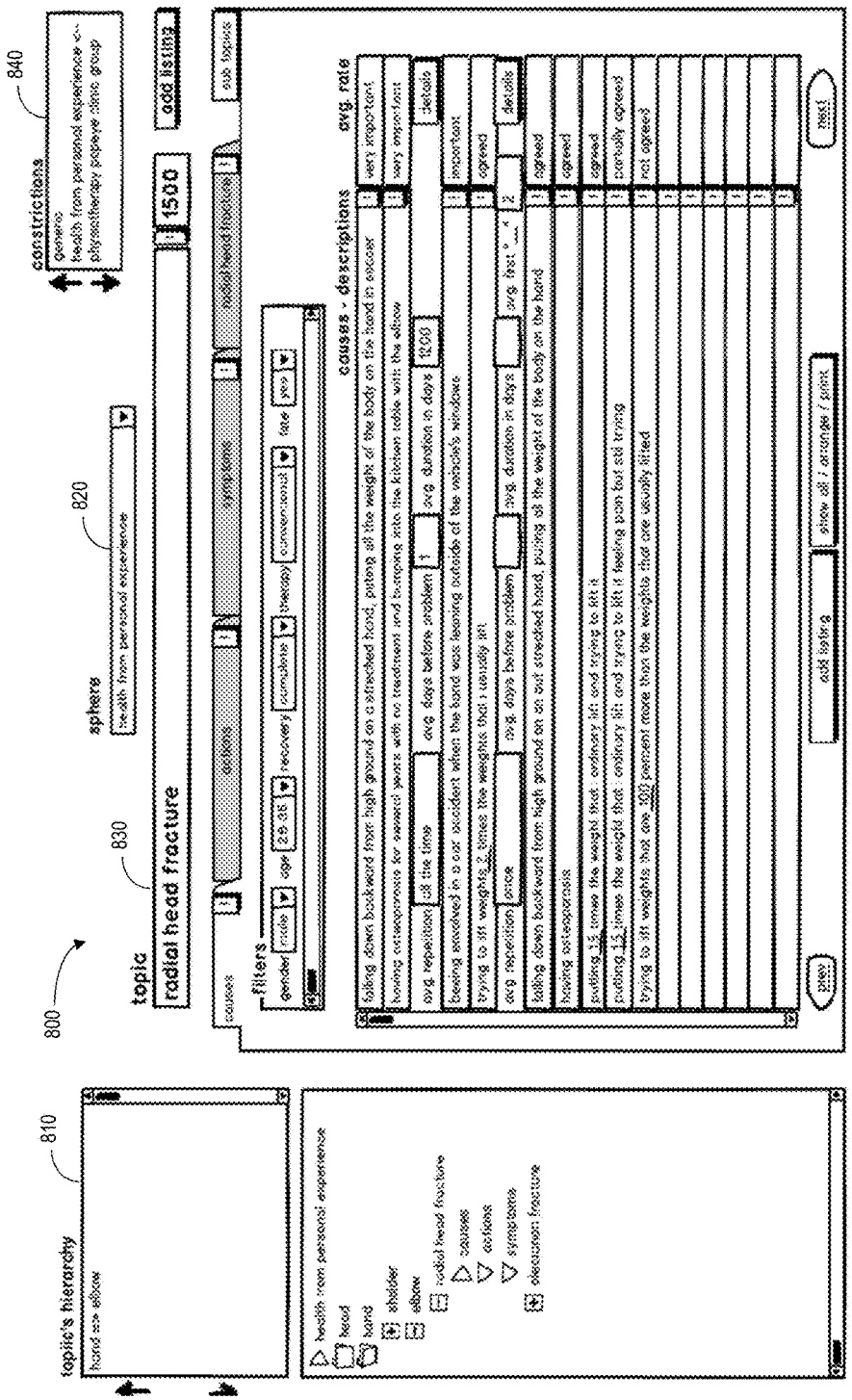
FIG. 8 is a display to view data and declare similarity between topics according to some embodiments.

FIG. 8 is a display 800 to provide data to a user according to some embodiments. The display 800 includes a topic's hierarchy 810, a sphere input area 820, a topic area 830, and a constrictions area 840. According to some embodiments, the following guidelines may be associated with the display:

When one or more of the three selection fields appears, in there is an option for the user to choose which level along these fields he wants the system to be temporarily adjusted for, influencing mostly the amount of categories displayed for the topic and their values. The combination of the three fields forms a constriction rule.

The constriction rule may be passed through the system's different embodiments while the same user is using the system.

If one of the selection fields is absent from the user's control, then the system uses a default value for that field which is determined in advance.

The categories that are presented and calculated for a topic are the ones that contain the data that is related to the main topic at the head of the page, and the sub-topic at the head of the card index (if a card index or a similar presentation form exist), this data is also confide to the specific hierarchy of the two topics, described in the "Hierarchy Field."

The most relevant categories are shown first with their associated summed up description fields' and importance values, they have priority which is determined after the aggregation process calculates how much weight to give them.

When a "Filters" section is present, there is an option for the reader to filter the categories displayed, deciding whose information he wants to view as declared by the writers, influencing the amount and values of the topic's categories.

The user may apply several actions on every topic/sub topic/category exhibited, by selecting the button "!" (or the equivalent) next to every topic/sub topic/category, a list of actions is exhibited and the user can choose between several actions that may include:
 a. Merging—attaching two or more topics/categories together that have similar text, so that in the future the system may unite these topics and use only one of them for presentation. The one that is elected to be representative is called the favorable one, and the system may present a separate screen for collecting the user's choice of the favorable one, or relay on the order of the categories/topics election to decide the user's favorable choice.
 b. Declaring a harmful/non legal text.
 c. Details—navigates to view the extended details of the topic/category.

Several actions that users may perform, and especially readers' actions on writers' data, won't take effect immediately; they may be accumulated instead, for future analysis by the system. The system decides later on when and if their changes will be performed, these actions may include: merging, unifying, changing listings' topic, etc.

Any Topic or Category exhibited in a multiple layout presentation in the system, which has similar topics' or categories' text is usually represented by one of them with the most favorable text.

The system's default setting for calculating and summarizing categories' values or amount of categories for a specific topic is the "Identical Topic" level of the selection field "identical topics". This means that topics that are considered as the same specific topic with the same specific hierarchy (identical as a whole) in the system are calculated and presented together.

Topics and categories in the system can be unified if they are identical, or merged if they are similar by their text (not considering affiliation/hierarchy). As a result a few roles derive:
 a. Unified topics are not necessarily merged, and merged topics are not necessarily unified.
 b. Unified topics are summarized by default.
 c. Merged topics are summarized by default only if they are merged along the whole chain of their parent topics reaching the top of the chain, or the first unified topics or the same specific presented topic.
 d. When topics are summarized, then their subordinate topics or categories that are merged are also summarized, this occurs along the whole descending hierarchy.

When multiple categories or topics are displayed, there is an option for the user to perform a search, sort actions.

Where text is to be entered, any or all information that would have otherwise been provided by the user, may also be provided automatically or semi-automatically based on the information already stored in the database and/or cache memory as described in connection with the embodiment shown in FIG. 7.

Validation checks on new entered text within topics or categories fields, may include an only lexicon words spelling check (lexicon might be updated according to contemporary demands), harmful words check, harmful and illegal sentences. These and other checks are all subject to the specific sphere or group restrictions.

FIG. 8 is a display 800 to enable a user to view data and declare similarity between topics in accordance with some embodiments. In particular, the display 800 includes an illustrative plurality of filtered categories containing data related to a topic. The user can navigate along the hierarchy tree of topics and choose a different topic for viewing. He or she may apply a general constriction to the data by navigating between different spheres/groups. The user may also navigate between the different subtopics at the top of the card index, and choose which sub topic he wants to view. The information exhibited to the reader may reside in the database and/or cache memory as illustrated in FIG. 7.

Figure 12:
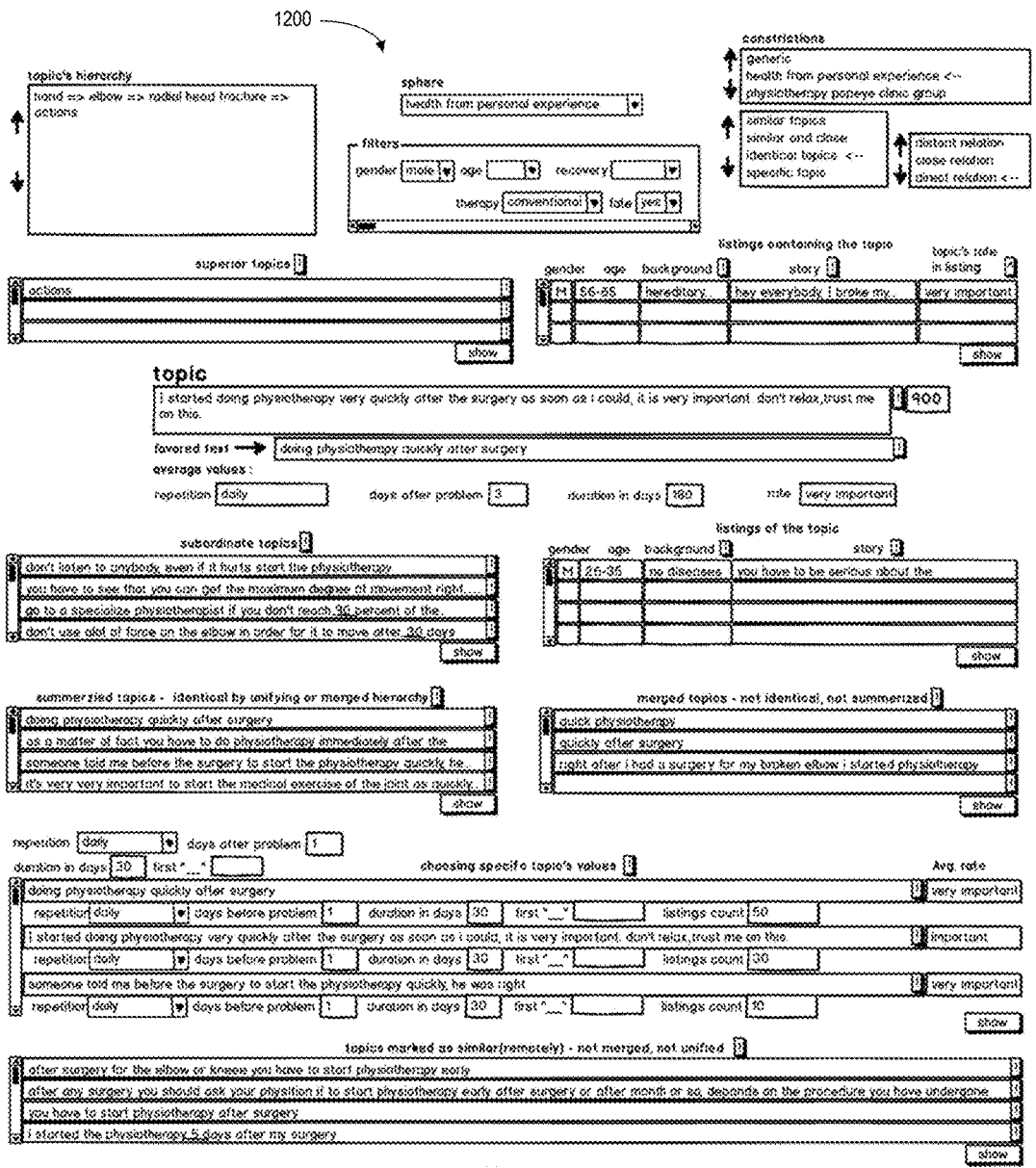
FIG. 12 illustrates a comprehensive topic's details exhibition according to some embodiments.

With respect to FIG. 8, upon the user viewing a topic, sub topics and their data, that may be constricted to a certain group/sphere and/or filters. The user may also perform actions like selecting a button (or the equivalent) titled "Sub Topics" enabling him to choose which sub topics he wants to view instead of, or additionally to the currently exhibited popular sub topics. Another action is selecting a button (or the equivalent) titled "Add Listing" that presents him with an exemplary embodiment in which he can insert a new listing, based on the topic/subtopics and categories which are currently exhibited, as will be shown in FIG. 10. Another action that the user may perform is by selecting a button (or the equivalent) titled "Show All/Arrange/Print" that presents him with the exemplary data editor which contains multiple categories in a cramped layout for various reasons such as printing, classifying and arranging, as will be shown in FIG. 9. Another action that the user may perform is by selecting the button (or the equivalent) titled "Details," then he or she will be presented with the comprehensive topic's details exhibition as illustrated in FIG. 12.

Figure 9:
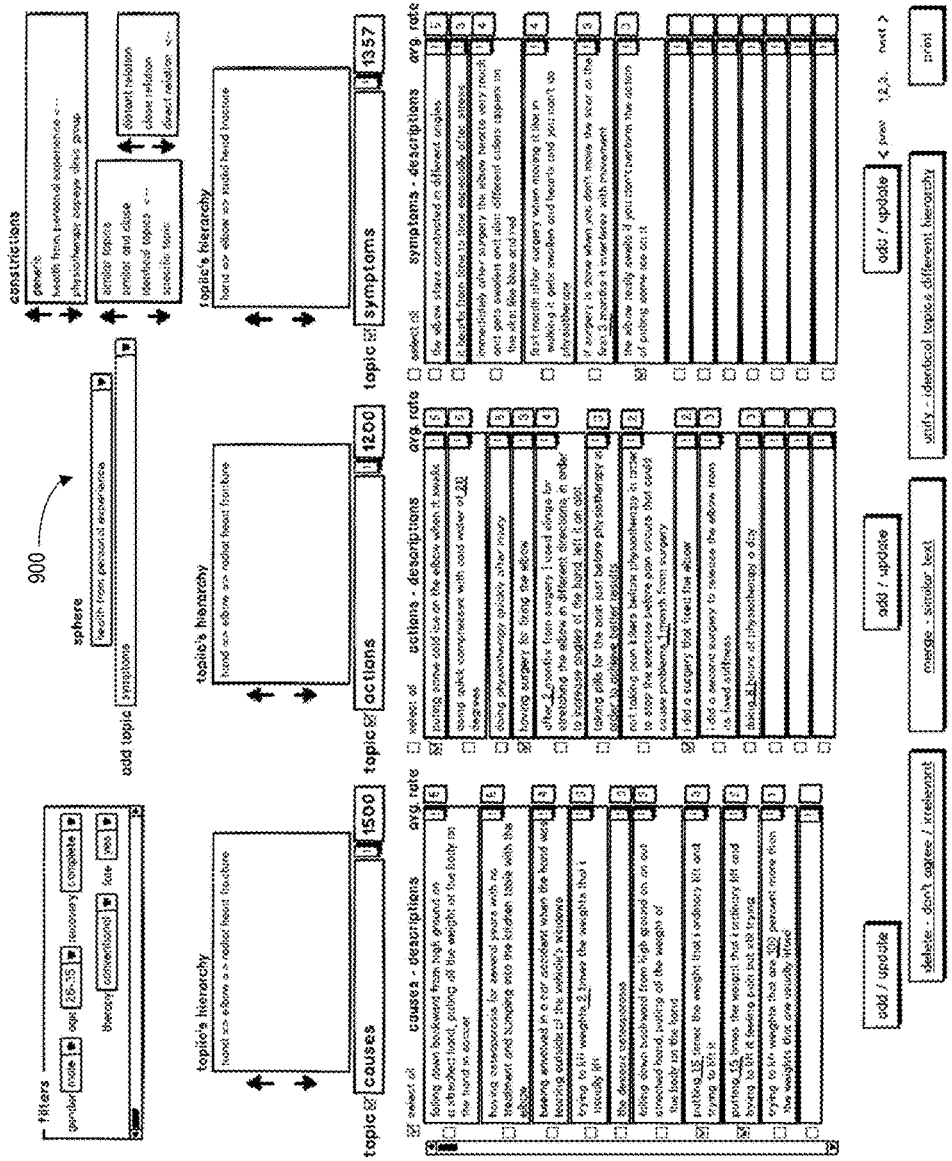
FIG. 9 is a display to enable a user to categorize and classify data in accordance with some embodiments.
Figure 14:
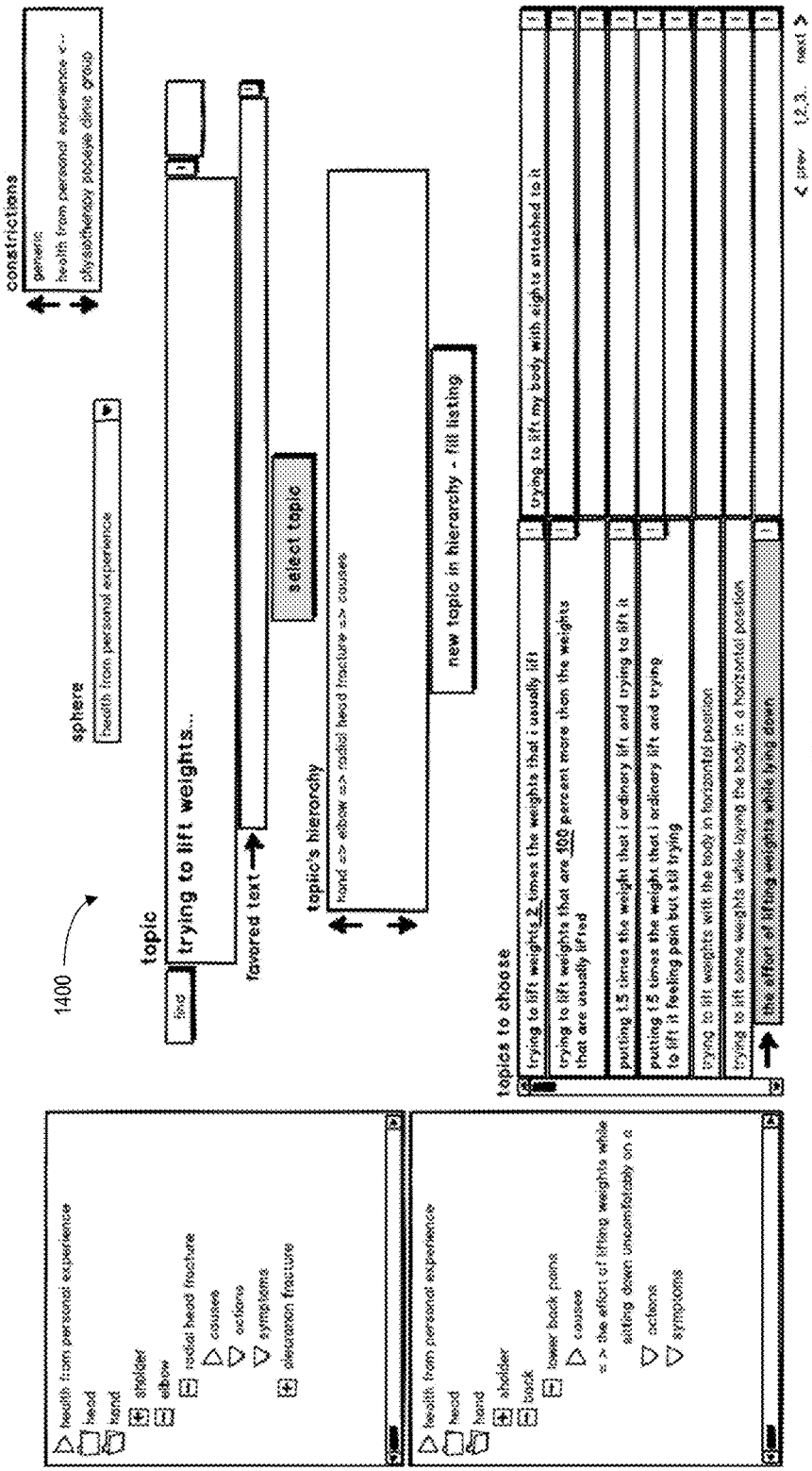
FIG. 14 illustrates a topic being selected for viewing or updating (or a topic being newly entered) according to some embodiments.

FIG. 9 is a display 900 with an illustrative plurality of categories to be rated for importance (by a user via a scale of values) and inserted to the system as a listing according to some embodiments. The display 900 may be associated with a data editor, which encapsulates classifying and presenting multiple categories in a cramped layout, for one or more topics (three topics example is shown in the display 900). Average rates of importance for a category are represented by small symbols or numbers, or something similar. The user may apply filters, search, sort and general constrictions to the data, using the three selection fields—spheres/groups, identical topics levels, and hierarchy relation levels. The user is able to apply different classifying, arranging and editing actions on the categories and topics by ways of one by one, and by ways of some or all together by selecting the proximate to the categories checkbox fields, or by a similar way. While inserting or updating a writer's specific listing, the exemplary embodiment shown in FIG. 9 enters another mode that may include an option to fill in rates and description fields' values to the categories, by temporarily presenting a separate screen over the illustration for each category (may be triggered by selecting the "!" button) or by enlarging the space for each category within the illustration, or by other ways. Upon inserting or updating, the order of the categories presented in FIG. 9 is changed giving more weight to the user's own filled out categories. His or her categories are presented first and may be highlighted with different colors; optional colors are orange and green (e.g., orange may represent partial agreement). This value may be addressed in further embodiments prompting the user to type in his or her own text or choose another category about which the user can fully (and not partially) express his or her opinion. The color green may represent all his other filled out categories. Another mode of this exemplary embodiment is exhibiting multiple topics/categories that are connected in various ways to the one specific topic/category selected for exhibition. For example: parent topics for a category/topic, identical topics or categories to a category/topic. In this mode only one topic might be selected for exhibition. In any mode, the cramped information exhibited to the reader may reside in the database and/or cache memory as illustrated in FIG. 7. With respect to FIG. 9, upon the user viewing one topic or more and their data, that may be constricted to a certain constriction rule and/or filters, the user may also perform several actions like:

I. Selecting a list button (or the equivalent) titled "Add Topic" that opens up a list of close proximity topics along the hierarchy relation for selection, in order to add one of them to the presentation on the exemplary embodiment, or the option to be presented with a multiple topics' choice illustration and choose a topic as shown in FIG. 14.

Figure 13:
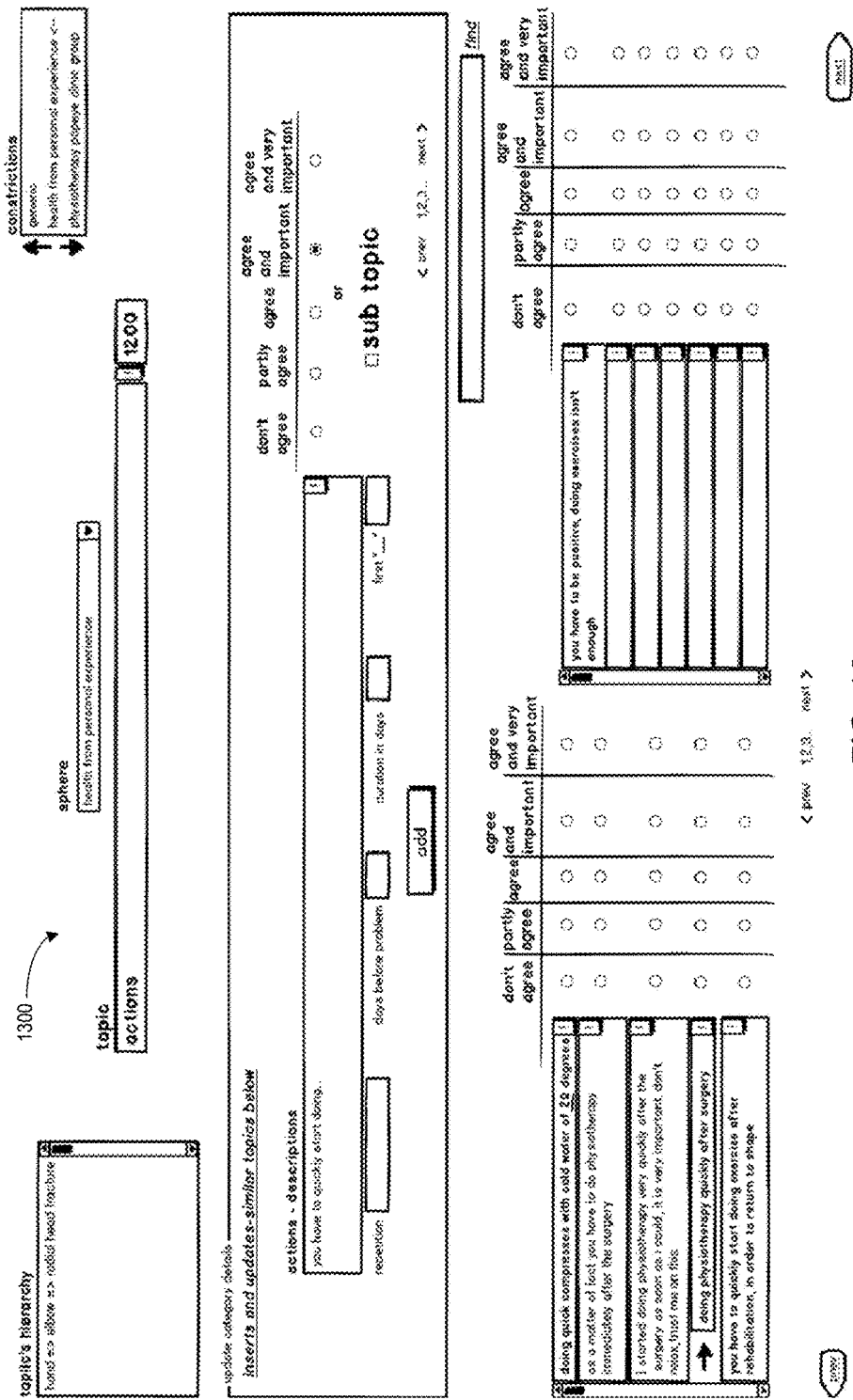
FIG. 13 illustrates a category or sub-topic being updated or inserted in accordance with some embodiments.

II. Selecting a button (or the equivalent) titled "Add/Update" which presents the user with the illustration embodying inserting new categories for a topic, or updating a specific category, simultaneously introducing similar categories to his text as shown in FIG. 13.

With respect to FIG. 9, upon selecting the checkboxes (or the equivalent), another set of actions that the user is able to perform on the categories/topics are:

I. Selecting a button (or the equivalent) titled "Merge—equivalent text" which performs the same action called merge that the singular category's button "!" performs, but on multiple categories/topics.

II. Selecting a button (or the equivalent) titled "Unify—identical topics different hierarchy" which is used for topics/categories that have different text, but are actually totally identical in their overall meaning. This situation can happen in the system because their hierarchy line is assembled differently, and so, their text may be missing or absolutely different, but the whole meaning arriving from the combined specific hierarchy line with the specific topics/categories text of each of the topics/categories is identical. Execution of this action by the user is similar to the merge action, despite not having to decide which topic/category is the favorable one.

III. Selecting a button (or the equivalent) titled "Delete—irrelevant" which performs an action of reducing the relevance of the category to the topic in the system's calculations, and also may perform the action of removing it temporarily from the presentation or marking it as disabled with an "X" or in a similar way, mainly for printing purposes.

Figure 10:
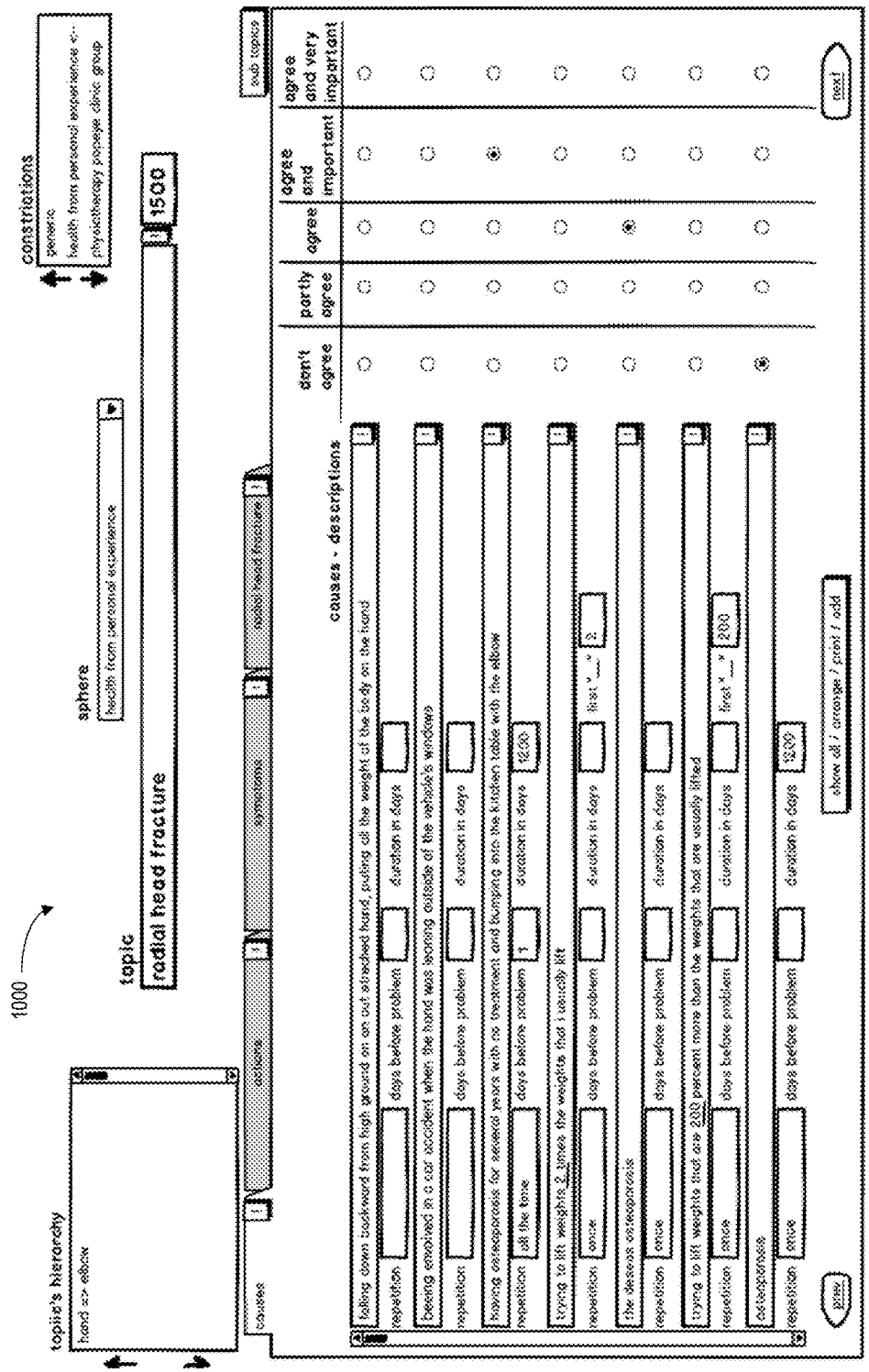
FIG. 10 shows an illustrative plurality of categories to be rated for importance (by a user using a scale of values) and inserted to the system as a listing according to some embodiments.

FIG. 10 shows a display 1000 with an illustrative plurality of categories to be rated for importance by the user using a scale of values, and inserted to the system as a listing, in accordance with some embodiments of the disclosed subject matter. The categories containing data related to a topic for filling-in, and this is part of the "filling a listing" process, the categories are rated for importance by the user, using a scale of values. While rating, the user may fill in description fields' values attached to the categories for precise info; these will later be summed up and aggregated for the main topic. Several subtopics connected to the main topic are laid out at the top of the card index, these subtopics may also be chosen by the user and then filled out partly or completely by him or her. Additionally, some large textual fields without a scale of values may be permitted to be filled in. Then all of these values and textual fields are inserted into the system as one listing belonging to the current user. The user may apply filters, search, sort and a general constriction of group/sphere to the data presented that may reside in the database and/or cache memory as illustrated in FIG. 7. With respect to FIG. 10, upon the user filling in his or her importance values to the categories he or she may be presented with a separate window or another card index (or similar) that contains one or more large textual fields for filling in the story or background, these have less constraints than the text of the categories when filled in, spelling checks for example are less abrasive.

Figure 11A:
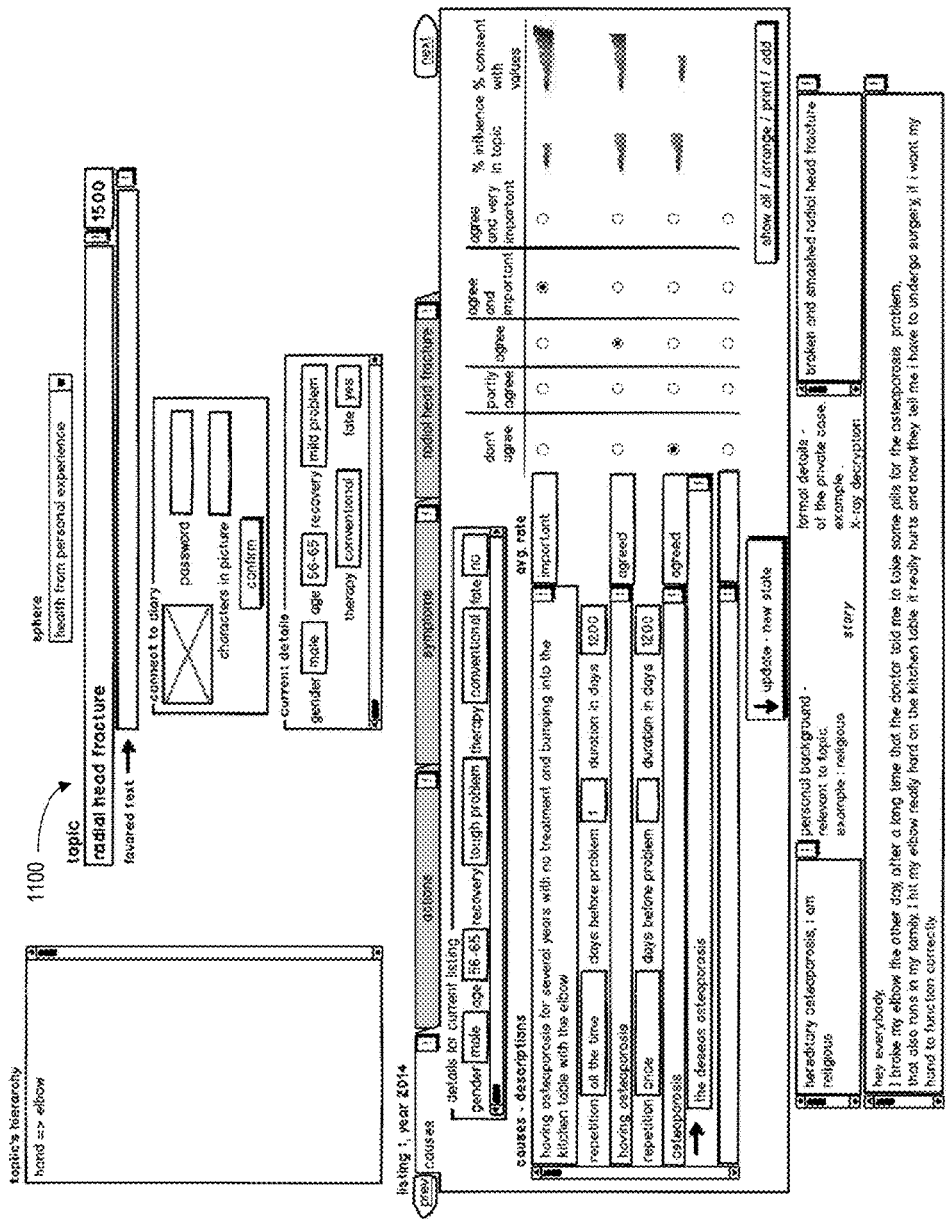
Figure 11B:
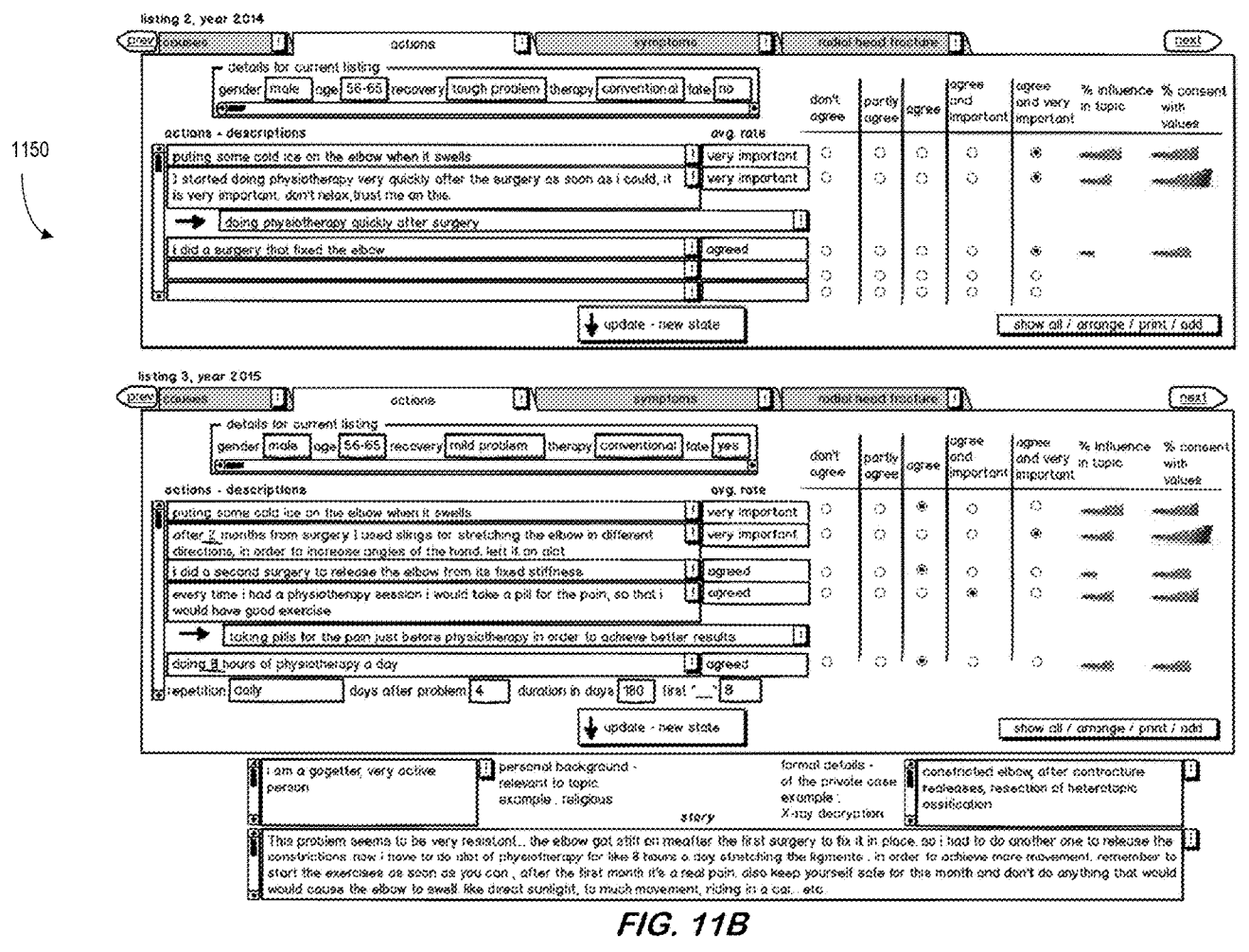

FIGS. 11A and 11B include a display 1100 to show an illustrative embodiment of a personal diary belonging to a specific topic, under a specific hierarchy, in accordance with some embodiments. The large fields are exhibited when viewing a user's listing as shown in FIGS. 11A and 11B. Before the user starts filling in his importance values in FIG. 10, he or she may fill in the personal details of a person or the situation related to the state he or she is describing, in a separate window or card index, or the similar. Including "Gender," "Age," and/or according to different spheres and groups also other details such as "Recovery," "Therapy," "Fate" related to a health sphere. Additionally the user may provide a password for updating his listing in the future and creating a personal diary as presented in FIGS. 11A and 11B. The scale of values used in FIG. 10 may consist of three or more top levels indicating that the user agrees with the text of the category, the difference between those top levels is the ascending value indicating how important does the user think the category is to the main topic/subtopic. The bottom of the scale may consist of two or more levels indicating that the user partly agrees, or doesn't agree entirely with text of the category in the context of the topic and subtopic. In case the user choses a level indicting partial agreement with the text, he or she may be prompted to type in his or her own version of the category, one that he does agree with, or chose another category that already exists in the system for the same action. This revision may take place at the end of the "filling a listing" process or at middle of it as illustrated in further embodiments. In order to save the filled-in data to the database, there may be a minimum amount of categories that must be filled out for each of the main topic/subtopics. The minimum amount might be different for each sphere/group and/or topic/subtopic. Once the minimum amount and other requirements are met in the current "filling a listing" process, the data may be saved automatically in the background and updated according to the user's further fillings or updates, nevertheless the user is allowed to cancel the save action by selecting a button (or the equivalent) titled "Cancel Save" next to the automatic "Data Saved" notice.

FIGS. 11A and 11B show an illustrative embodiment of a personal diary belonging to a specific topic under specific hierarchy, in accordance with some embodiments of the disclosed subject matter. This diary may include all of the specific writer's listings for that topic on the timetable, and is to remain essentially the same as how the writer created it and changed it along the way, only the writer is able to modify and update his categories. Even though the diary is personal, other users may view it, and perform some actions on it. The diary may also present a reference to the system's aggregated info, compared with the specific user's diary's info. For example, in the embodiment, the field "% influence in topic" shows how dominant or/and popular or/and relevant is the category for the topic within the listings. The field "% consent with values" shows how many users agreed with the listing's category's values. Topics' and categories' text which have similar other favored text in the system is shown in a proximate field marked with an arrow (or the similar) stating the system's favorable text. The data presented may reside in the database and/or cache memory as illustrated in FIG. 7. The system acts on the assumption that updates relating to the same state or time period of a specific listing is portrayed in the same listing. The writer is prompted about modifying of categories' rates/description fields' values, and adding or subtracting categories that are relating to the same state or time period to be in the same listing. Update of these values and categories that refers to a different state or time is portrayed in a different listing. Furthermore, as long as a category's values don't change along the listings' chain, it is still in effect, meaning the last values entered are valid. With respect to FIGS. 11A and 11B, upon updating the diary, the writer may create a new listing by selecting the button (or the equivalent) "Update—New State." Then he or she will be navigated to a new card index or the similar that is filled with all of the diary's categories, including default values that are the most recent values within the listings (non-relevant categories may be omitted). The writer may be prompted with a message that the new listing will encompass by default all of the categories enclosed in the previous listings and their last values in case they are not revised, and that only categories that he will change will be part of the new listing. Other relevant categories that aren't already included in the diary are also presented among the diary's categories. The process by which this new listing is inserted into the system is similar to the "filling a listing" process using the same principles as the way it is inserted when it's not connected to a diary, as shown in FIG. 10. Similar restrictions may be enforced and the user may change his personal details to match the new state (and fill in the large textual fields). Other actions are also available within the embodiment presented in FIGS. 11A and 11B, by ways of selecting the button "!" at the appropriate field (or by similar ways, like designated buttons). Actions on the whole diary may be activated through the main topic and may include:
  I. Creation of a new listing disconnected from the diary with default categories and values that are the same as the diary's categories, for users how wants to copy this specific data and fill in their own values. This action is followed by the "filling a listing" process as shown in FIG. 10.
  II. Changing the diary's topic. The writer that created the diary can chose to change the topic of the diary, by selecting another topic form a list of topics as presented in FIG. 14. The categories' values may be deducted from the current topic's aggregation results, and calculated for aggregation within their new topic. Other users can also chose to change the topic of a diary but their changes won't take effect immediately, they may be accumulated instead for future analysis. In any case, the diary will always appear the same when the writer enters, any changes will be noted in the presentation next to the original writer's data.

Actions on categories or subtopics may be activated through the button "!" at the appropriate field (or by similar ways, like designated buttons) and may include:
  I. Updating the text. The writer of the diary may be navigated to a separate multiple categories/topics exhibition embodiment as shown in FIG. 13.
  II. Deleting a listing. The writer may delete a specific listing.
  III. Appealing against the connection between certain texts to their favorable ones (which were chosen by the system). A separate screen may be exhibited for entering a reason or by similar ways.

FIG. 12 is a display 1200 illustrates a comprehensive topic's details exhibition according to some embodiments. This exhibition refers to the main topic both as a topic and as a category, and may contain the most relevant information in each of the related sections. Such as the section titled "Listings Containing the Topic" which presents a short summary of listings in which the main topic is filled out as a category. Another section may be titled "Superior Topics" which presents parent topics containing the main topic. Other section examples are shown in the embodiment. Description fields may be titled "Average Values" or "Specific Values" when used for filtering. All the sections may be expanded for exhibition by clicking the button (or the equivalent) titled "Show All" and being navigated to a multiple exhibitions illustration as shown in FIG. 9. The user may also appeal against the connection between the main topic and some of its acclaimed related topics. The system enables the user to apply filters, search, sort and the three general constrictions to the data presented that may reside in the database and/or cache memory as illustrated in FIG. 7. Another set of sections comprising the topic's details may include:
  I. "Listings Of The Topic" for presenting a short summary of listings written by writers for the main topic.
  II. "Subordinate Listings" for presenting categories or sub topics that are written in listings for the topic, or associated below it by other means.
  III. "Summarized Topics—Identical By Unifying Or Merged Hierarchy" for presenting all the topics that are identical to the main topic, and notifying that these are the topics whose values of importance and description fields are summarized and exhibited throughout the system.
  IV. "Merged Topics—Not Identical, Not Summarized" for presenting all the topics that have similar text to the topic's text, but their values are not summarized because they are not identical, as they may have different hierarchy, meaning different affiliation and context.

The sections may also include exhibiting the different appearances of the main topic as a category with different description fields' values combinations, under the section titled "Choosing Specific Topic's Values." According to the identical topics constriction level, summarized and merged topics are also presented with their values. A dedicated filter may be placed near this section for choosing which values should be presented and summed up for importance values. Another section that may be exhibited is titled "Topics Marked As Similar (remotely)—Not Merged, Not Unified" for presenting topics/categories that the users have marked as identical or have similar text, but the system hasn't authorized this diagnosis yet, or may have even canceled this diagnosis.

FIG. 13 is a display 1300 that illustrates a category or sub-topic being updated or inserted in accordance with some embodiments. Validation checks on the text may be performed by the system. Every change is associated to the main topic under its hierarchy. The change, if it may occur, may be part of the current "filling a listing" process, and documented in the current listing, thereby allowing only the topic and subtopics that are at the head of the listing to be the main presented topic at the header of the illustration for exhibition. The user may apply search, sort and general constriction of spheres/groups to the data presented, that may reside in the database and/or cache memory as illustrated in FIG. 7. Upon changing the categories/subtopics, their text, scale of values and description fields may be updated within the "Update Category Details" section. The system presents by default the main topic's and current listing's categories/subtopics. In FIG. 13 they reside within the fields section at the bottom, for further filling in of importance rates. The description fields' values may be changed in the update section or a separate window or the similar. Upon presenting the topic's categories, before any text is changed or inserted in the "Update Category Details", the user's categories are presented first, and may be highlighted with different colors same as performed in FIG. 9. Optional colors are orange and green. Orange may represent partial agreement, a value for which the system may prompt the user to type in his own text or choose another category from the system which he can fully and not partially express his opinion about. Changing a category rated as "Partly Agree" may delete it from the current listing and replace it with the changed category. With respect to FIG. 13, when the text of a category/subtopic is changed in the update section, similar categories/subtopics to the new text are shown in the categories' fields below, for quick selection. Priority may be given to categories/subtopics that are within the general constriction of the hierarchy relation levels titled "Direct Relation" and "Close Relation" to the main topic. Favorable text in the system may also be given priority. If categories/subtopics that have not been chosen as favorable text (non-favorable) are more textually similar to the new text, they will be exhibited first and may be followed by another category or subtopic that was chosen as the favored text for them. After the text is changed by the user he or she can't rate it as "don't agree" or "partly agree," selecting the button (or the equivalent) titled "Add" adds the new text to the topic after validation checks, and exhibits it among the topic's categories below. Marking the text as a "Sub Topic" may eliminate the scale of values for it, making it a future card index header in the current listing. With respect to FIG. 13, new description fields may be set while typing the categories' text. For example, within the constriction level of the "Generic" sphere, and also certain other spheres/groups, every number typed in as a digit in the categories' text becomes a description field (limited by max number of fields set by the system). These description fields may be titled "avg. first_", "first_", "second_", or by other similar ways of marking the description fields' values within the text. Other spheres/groups may enforce a strict pre-defined set of optional description fields for certain topics, such as "Repetition" and "Duration in days" in a health sphere of knowledge.

FIG. 14 is a display 1400 that illustrates a topic being selected for viewing or updating (or a topic being newly entered) according to some embodiments. Selection is either by ways of searching similar text to the one being entered in the main topic's field at the header, or by ways of navigating through the topics' trees of hierarchy for close relation topics/categories. After a topic is selected it may be presented or updated through other embodiments as illustrated in FIGS. 8 and 10, along with its categories and subtopics. New topics are also created through this embodiment under a specific hierarchy chosen by the user. The user may apply search, sort and general constriction of spheres/groups to the data presented, that may reside in the database and/or cache memory as illustrated in FIG. 7. While searching and presenting topics/categories which are similar to the typed in main topic, priority is given to favorable text in the system, still taking into account better matches from non-favorable topics/categories, same as described in FIG. 13. Selection from the trees of hierarchy is also possible, only topics and sub topics which have subordinate categories may be shown in the trees, represented by their favorable text. That is until the moment a category is selected to be the main topic for selection, in this case it may be shown in the trees. With respect to FIG. 14, the illustration may include two trees for highlighting the difference in terms of hierarchy connections, between the currently chosen main topic at the header, and the proposed other topics for selection at the bottom. If a topic that already exists in the system is presented in the main topic's field, it may also be presented at the bottom section, alongside with its subtopics and categories. But once the user changes the text at the main topic's field, the exhibition is changed to show only similar topics/categories to the text, until selection is made (and vice versa). Final selection of a topic to be the transmitted for the desired action purposes, through the system's other embodiments, is carried out by selecting the button (or the equivalent) titled "Select Topic" for topics that are already part of the system and under a specific hierarchy. Topics that are not part of the system under the specific hierarchy described in the "Topic's Hierarchy" field are entered into the system by selecting the button (or the equivalent) titled "New Topic In Hierarchy—Fill Listing," validation checks on the text may be performed by the system, followed by the "filling a listing" process for writing a complete listing for that new topic.

Figure 15:
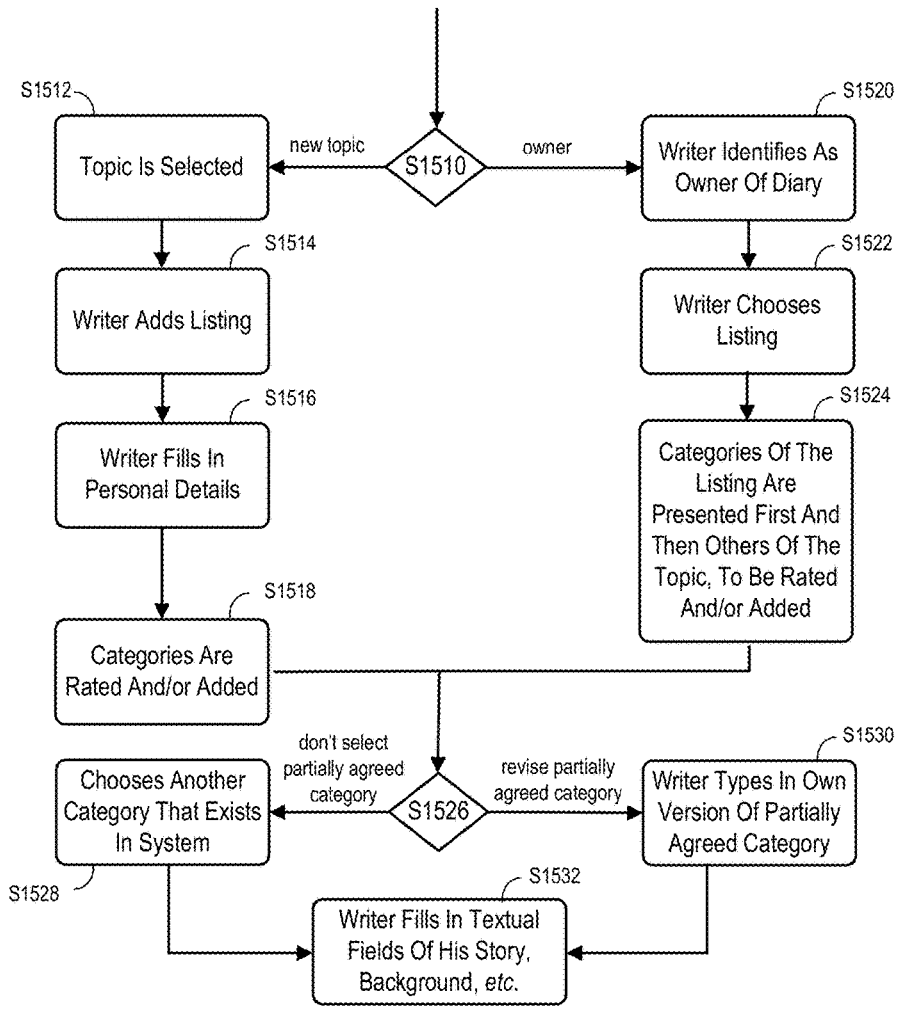
FIG. 15 illustrates a process to fill data (listing) associated with a specific topic in accordance with some embodiments.

FIG. 15 illustrates a process to fill data (listing) associated with a specific topic in accordance with some embodiments. First at S1510, a writer selects a topic at S1512 or identifies as the owner of a topic's diary at S1520 (based on the use of such embodiments as the exemplary embodiments shown in FIGS. 14 and 11A/11B). These topics may reside in a computer network based communities such as the one exemplified in the network architecture shown in FIG. 7. Next, the writer may choose to fill in a new listing at S1514 and S1516, or update an existing listing from his diary at S1522, the listing includes rating several categories of the topic, and filling in description fields values for them (using such embodiments as the exemplary embodiments shown in FIGS. 9 and 10) at S1518 or S1524. Adding new categories to the listing is also available through such embodiment as the exemplary embodiment shown in FIG. 13. Optionally, in a new listing the writer may fill in personal details and password for future updates and diary management. Next at S1526, the writer is prompted to revise categories that he rated as partly agreeing with (e.g., at S1530 and S1532), this prompt may be followed by an update category embodiment as illustrated in FIG. 13.

Through this embodiment he or she may optionally type in new text for the category which must coincide with certain validation checks instead of the category he or she partially agrees with. Alternatively (and optionally), he or she may choose another category from the ones already residing in the system, that has a text that he does agree with altogether, and not partially. Finally the writer may fill in long textual fields containing his story, background and other fields depending on the sphere or group he or she is a part of. These are entered within a separate window, or another card index (or the similar) in the rating illustration such as described in FIG. 10. With respect to the process described in FIG. 15, once the minimum amount of categories and other requirements are met, in the current "filling a listing" process, the data may be saved to the database automatically in the background and updated according to the writer's further fillings or updates. Nevertheless the writer is able to "cancel" the save action by selecting a button (or the equivalent) that may be titled "Cancel Save." When the filling a listing process is finished, meeting all the requirements and performing the save action. Then all of the ratings, values and textual fields may be inserted into the system as one listing belonging to the current writer, and aggregated with the system's data.

Figure 16:
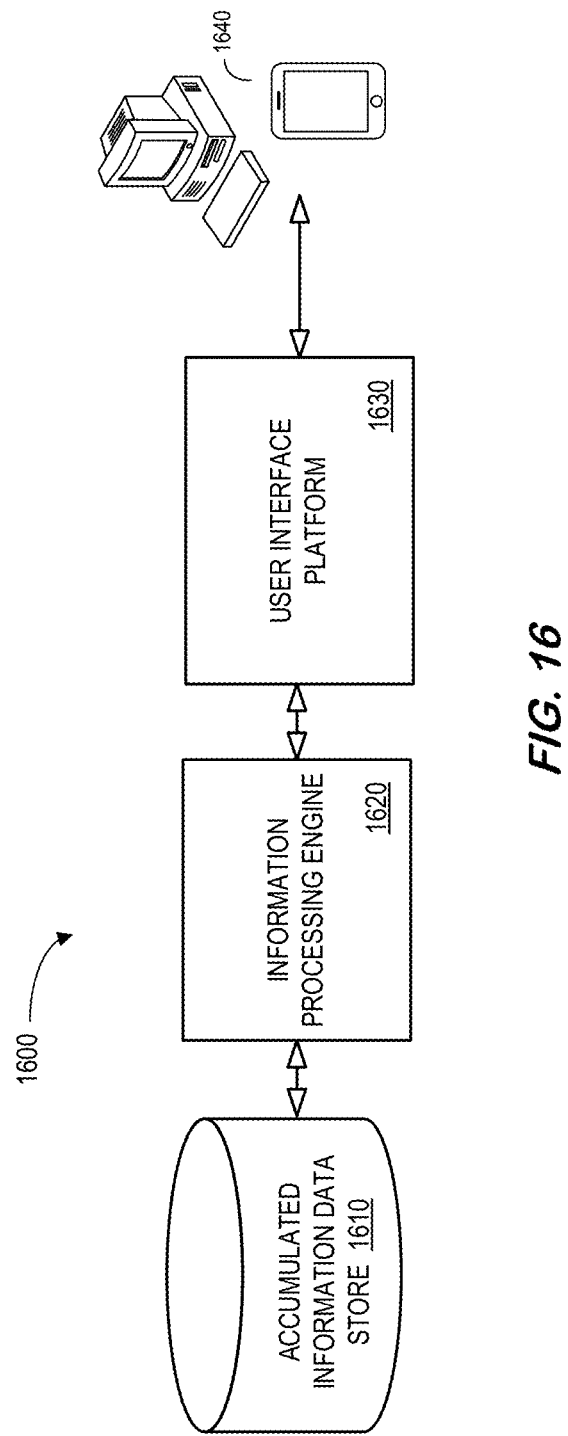
FIG. 16 is a high level view of a system architecture according to some embodiments.

FIG. 16 is a high level view of a system 1600 architecture according to some embodiments. The system may include an accumulated information data store 1610 that includes a plurality of topic nodes, each topic node having a text description of limited length and at least some of the topic nodes being associated with one or more attributes (e.g., a rating score, a description field, etc.). Note that a particular topic node may be associated as a parent topic node to one or more other child topic nodes such that the topic nodes in the accumulated information data store form at least one data tree. The system may further include an information processing engine 1620 coupled to the accumulated information data store 1610 and programmed to access information in the accumulated information data store 1610. The information processing engine 1620 may determine that a plurality of topic node text descriptions are similar and classify them as similar topic nodes. The information processing engine 1620 may also select at least a part of the text description associated with one of the similar topic nodes as a favorable text description for the similar topic nodes. According to some embodiments, the information processing engine 1620 may also automatically identify all other topic nodes in the accumulated information data store 1610 that have the same text description as one of the similar topic nodes and merge all of the other identified topic nodes with the similar topic nodes. The information processing engine 1620 may also unify the similar topic nodes as identical topic nodes when they are currently grouped together as having the same upper tree hierarchy and classify the unified topic nodes that are also similar topic nodes as a single topic node (represented by the favorable text description) and any attribute associated with the unified topic nodes may be automatically mathematically combined. According to some embodiments, the system 1600 further includes a user interface platform 1630 programmed to receive from a user (e.g., from a user device 1640) a selection of a topic node as a current topic node of interest. The user interface platform 1630 may then display to the user information about the current topic node of interest, including information about the child topic nodes of the current topic node of interest.

According to some embodiments, the child topic nodes might be summarized: (1) first by similarity between child topic nodes which are reduced in amount and represented by favorable text descriptions, with mathematically combined attributes, and (2) second by the unification of identical topic nodes to the current topic node of interest which increases the amount of child topic nodes being displayed by the coupling process.

Figure 17:
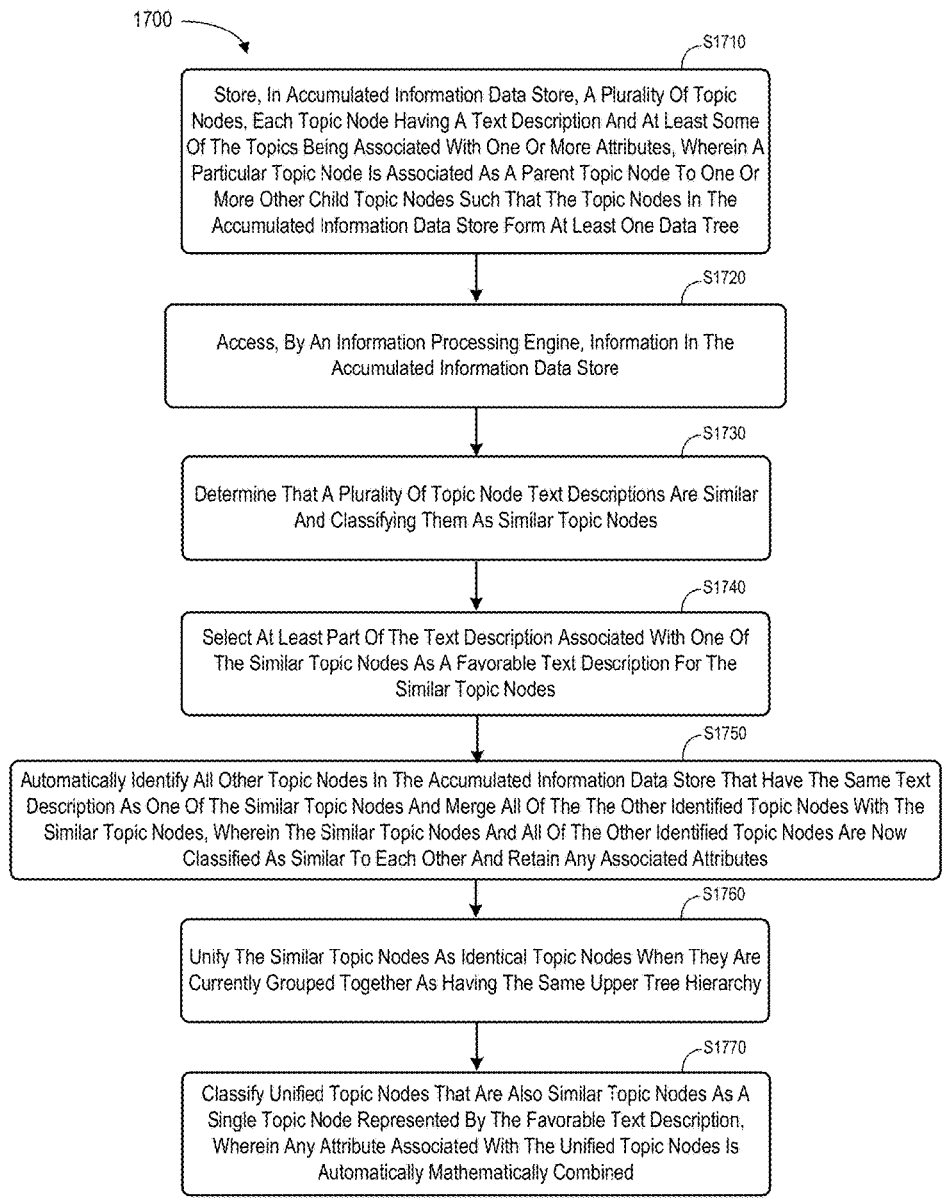
FIG. 17 is a method according to some embodiments.

FIG. 17 is a method 1700 according to some embodiments. Note that the steps of FIG. 17 may be performed via an appropriate hardware and/or be executed in any order that is applicable. At S1710, the system may store, in an accumulated information data store, a plurality of topic nodes, each topic node having a text description of limited length and at least some of the topic nodes being associated with one or more "attributes". As used herein, the term "attribute" might refer to any information associated with a topic node. Examples of attributes might include, for example, a rating score reflecting an importance of a topic node, a description field having pre-determined values that describe an aspect of a topic node, a popularity value, a date value, etc. According to some embodiments, a particular topic node is associated as a parent topic node to one or more other child topic nodes such that the topic nodes in the accumulated information data store form at least one data tree. At S1720, the system may access information in the accumulated information data store and determine that a plurality of topic node text descriptions are similar and classifying them as similar topic nodes at S1730. The similarly of text might be pointed out by a user or be automatically determined by the system (e.g., taking into account synonyms, abbreviations, nicknames, acronyms, and other semantic rules). At S1740, the system may select at least part of the text description associated with one of the similar topic nodes as a favorable text description for the similar topic nodes. At S1750, the system may automatically identify all other topic nodes in the accumulated information data store that have the same text description as one of the similar topic nodes and merge all of the other identified topic nodes with the similar topic nodes, wherein the similar topic nodes and all of the other identified topic nodes are now classified as similar to each other and retain their associated attributes. At S1760, the system may unify the similar topic nodes as identical topic nodes when they are currently grouped together as having the same upper tree hierarchy. At S1770, the system may classify the unified topic nodes that are also similar topic nodes as a single topic node represented by the favorable text description, wherein any attributes associated with the unified topic nodes is automatically "mathematically combined". Note that attributes might be mathematically combined in any of a number of different ways. Examples of mathematical combinations might be associated with an averaging process, a summing process, a selection of a minimum value, a selection of a maximum value, a selection of an earliest date, a selection of a latest date, etc.

Figure 18:
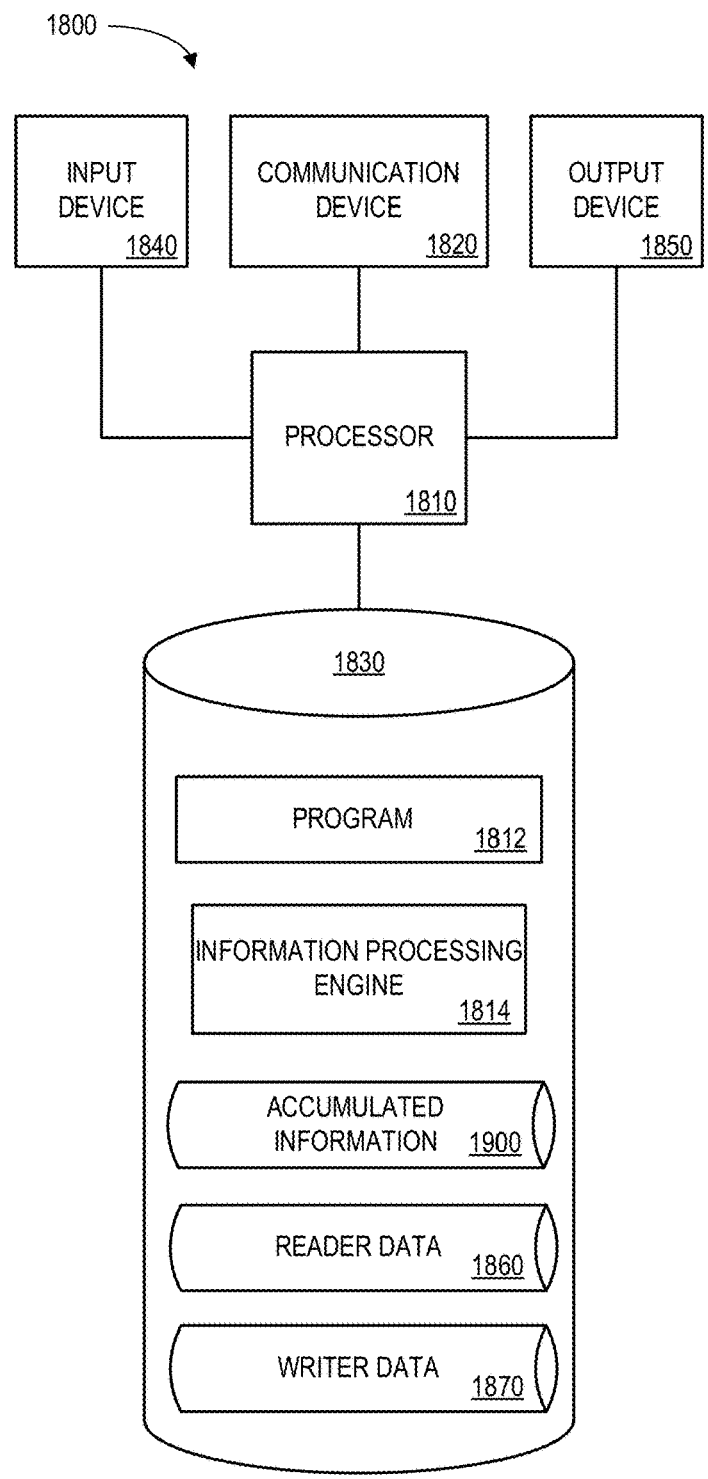
FIG. 18 is a block diagram of an apparatus or platform in accordance with some embodiments of the present invention.

The embodiments described herein may be implemented using any number of different hardware configurations. For example, FIG. 18 is a block diagram of an apparatus or platform 1800 that may be, for example, associated with the system 700 of FIG. 7 and/or the system 1600 of FIG. 16. The apparatus or platform 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote reader devices, writer devices, etc. The apparatus or platform 1800 further includes an input device 1840 (e.g., a computer mouse and/or keyboard to input database and/or system information) and/an output device 1850 (e.g., a computer monitor to render a display, provide alerts, transmit recommendations, and/or create reports). According to some embodiments, a mobile device, database system, and/or PC may be used to exchange information with the apparatus 1800.

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or an information processing engine 1814 for controlling the processor 1810. The processor 1810 performs instructions of the programs 1812, 1814, and thereby operates in accordance with any of the embodiments described herein. For example, the processor 1810 may access an accumulated information data store that includes a plurality of topic nodes, each topic node having a text description of limited length and at least some of the topic nodes being associated with at least one attribute. In some cases, a particular topic node may be associated as a parent topic node to one or more other child topic nodes such that the topic nodes in the accumulated information data store form at least one data tree. The processor 1810 may then determine that a plurality of topic node text descriptions are similar and classify them as similar topic nodes. At least part of text description associated with one of the similar topic nodes may be selected as a favorable text description for the similar topic nodes. The processor 1810 may automatically identify all other topic nodes in the accumulated information data store that have the same text description to the similar topic nodes and merge all of the other identified topic nodes with the similar topic nodes, wherein the similar topic nodes and all of the other identified topic nodes are now classified as similar to each other and retain their associated attributes. The processor 1810 may also unify the similar topic nodes as identical topic nodes when they are currently grouped together as having the same upper tree hierarchy. The processor 1810 may classify the unified topic nodes that are also similar topic nodes as a single topic node represented by the favorable text description, wherein any attribute associated with the unified topic nodes is automatically mathematically combined.

The programs 1812, 1814 may be stored in a compressed, uncompiled and/or encrypted format. The programs 1812, 1814 may furthermore include other program elements, such as an operating system, clipboard application, a database management system, and/or device drivers used by the processor 1810 to interface with peripheral devices. As used herein, information may be "received" by or "transmitted" to, for example: (i) the an apparatus or platform 1800 from another device; or (ii) a software application or module within the apparatus or platform 1800 from another software application, module, or any other source.

In some embodiments (such as the one shown in FIG. 18), the storage device 1830 further stores an accumulated information database 1900, reader data 1860, and/or writer data 1870. An example of a database that may be used in connection with the an apparatus or platform 1800 will now be described in detail with respect to FIG. 19. Note that the database described herein is only an example, and additional and/or different information may be stored therein. Moreover, various databases might be split or combined in accordance with any of the embodiments described herein.

Referring to FIG. 19, a table is shown that represents the accumulated information database 1900 that may be stored at the apparatus 1800 according to some embodiments. The table may include, for example, entries identifying topic nodes associated with tree hierarchies. The table may also define fields 1902, 1904, 1906, 1908, 1910, 1912, 1914, 1916, 1918 for each of the entries. The fields 1902, 1904, 1906, 1908, 1910, 1912, 1914, 1916, 1918 may, according to some embodiments, specify: a topic node identifier 1902, a text description 1904, a rating 1906, children 1908, unified nodes 1910, similar nodes 1912, a parent node 1914, averaged descriptions 1916, and spheres/groups 1918. The accumulated information database 1900 may be created and updated, for example, based on information from reader and/or writer devices.

The topic node 1902 may be, for example, a unique alphanumeric code identifying a topic node within a tree hierarchy (e.g., and might represent a label for that particular node). The text description 1904 might comprise an alphanumeric string of limited length that may be associated with the topic node. The rating 1906 might comprise, for example, a numerical value that has been entered by a user (or a group of users) to rate the importance of that particular topic node. The children 1908 might represent labels or topic node identifiers 1902 that create a tree hierarchy. The unified nodes 1910 might represent labels or topic node identifiers 1902 that indicate identical topic nodes that have been unified in accordance with any of the embodiments described herein (e.g. with nodes ABC and Z being unified as illustrated in FIG. 19). The similar nodes 1912 might indicate nodes that a user has identified as being associated with a single topic because of semantic similarity (and may share a favorable text) (e.g., with nodes AC and ZC being merged as illustrated in FIG. 19). The parent node 1914 might indicate the node's immediate parent in the tree hierarchy. The averaged descriptions 1916 might be similar to the rating 1904 but describe other details that can be averaged about the node other than the node's general importance. The spheres/groups 1918 might indicate areas of knowledge or groups of users associated with the topic node.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising" (or the similar), when used in this specification, specify the presence of stated features, integers, steps, operations, elements, and/or components, but do not preclude the presence or addition of one or more other features, integers, steps, operations, elements, components, and/or groups thereof. It should also be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

Glossary

This section will set forth some terms used in this patent application along with their associated meanings. As used herein, the phrase "tree of topics" may refer to, for example, a hierarchical arrangement of data made out of short textual phrases/paragraphs, aligned in a branched tree, wherein each node is called a "topic." One topic is at the head of the tree and it can have endless chains of children topics. Note that a topic in a tree may be dynamically shown as the main presented topic at the header of a presentation, or a category with a rating relating to its presented parent topic. For example, when presenting node "A," another node "AC" may be referred to as its category (as illustrated in FIG. 6). When presenting node "AC", "AC" may be referred to as the main presented topic and node "ACE" may be presented as its child topic. As used herein, the term "topic" may refer to, for example, every node in a tree that represents certain textual data. This may include, for example, nodes that temporarily are referred to as a "child topic," a "category," a "sub-topic," a "main presented topic," etc. According to some embodiments, any topic node may have one or more child topic nodes. Moreover, a topic node may include values such as a rating and description fields.

As used herein, the terms "main presented topic, "presented topic," and "main topic" may refer to, for example, a topic that in the temporary perspective view of the system that is set to act as the main topic for which data is shown or aggregated. According to some embodiments, the focus is on the main topic and all the averages and ratings are relating to it. The main topic may, for example, usually be presented at the header of presentation screens.

As used herein, the term "child topic" may refer to, for example, a topic that in the temporary perspective view of the system is treated as the child of its parent topic (relating to it) in the tree of topics. For example, child topics may be associated with situations where the system presents the subordinate children of the main presented topic. Note that a child topic may have a rating value, in which case it may be referred to as a "category." If the child topic does not have a rating value, it may be referred to as a "sub-topic." That is, a "sub-topic" might represent a child topic that has no rating. This type of node may typically point out a more specific segment of its parent topic (e.g., body→hand). Note that a sub-topic may usually have one or more child topics (e.g., "ABC" may be a sub-topic of "AB" while "AB" is sub topic of "A"). As used herein, the term "category" may refer to, for example, a child topic that has a rating relating to its parent topic. For example, "ABCX" and "ABCZ" may be categories of "ABC" (as illustrated in FIG. 6).

As used herein, the term "sphere" may refer to, for example, different spheres of information, which represent different fields of knowledge, such as "Sport," "Health," "Vehicles," etc. These spheres contain all the trees of topics in a system. The spheres are closed environments of information which might or might not share information with each other, by ways of that might include averaged ratings and/or selected favorable text, and/or coupled child topics, etc. These spheres may be hierarchically arranged, the highest level may be referred to as the "Generic" sphere which is the most abstract (and contains all the data from the other spheres). The spheres are also closed environments of rules such as openness to change. The data within a sphere may be very open to changes, which dynamically builds trees of content and connections between them. Note that the data within a sphere might instead be strict and preloaded in advance to use of the system, perhaps only letting users fill-in a categories' rating. For example, a "Health" sphere may be preloaded with all the medical conditions, with sub topics of "Symptoms," "Causes," and "Actions." As used herein, the term "group" may refer to, for example, a structure similar to a sphere but defined by different groups of people instead of different fields of knowledge.

As used herein, the term "similar" (associated with a "merge" action) may be associated with similarity between topics that is suggested by the users in various screens of the system (merge action), in which several topics are shown together. Note that similar topic nodes are sometimes referred to as "equivalent" topic nodes. Also note that similarity may only refer to the semantic text of the topics without considering parent topics. According to some embodiments, the system may decide to eventually declare two topics as similar, such as when a relatively large number of users point out similarity (or by other statistical comparison). The system may also automatically decide similarity between topics with no user intervention. As used herein, the phrase "favorable text or topic" may refer to, for example, situations where two or more topics are declared as similar, and the text of one of them (the favorable node) is chosen to represent them all in the system or different favorable text within each specific sphere/group.

As used herein, the term "identical" (associated with a "unified" action) may refer to, for example, a situation wherein a unifying operation is suggested by the users in various screens of the system (merge action), in which several topics are shown together. Note that identical topic nodes are sometimes referred to as "paired" topic nodes. Unification may refer to the semantic text of the topics and their affiliation considering their line of parent topics' semantics, so that as a whole combined with the texts of each of their parent's lines they are considered identical. The system may decide to eventually declare two topics as identical if a relatively large number of users point out unification (or by other statistical comparison). Note that the system may also automatically decide unification between topics with no user intervention (e.g., where there is a continuous line of respective similar topics to the top or to the same parent, or to unified parents).

As used herein, the terms "summarized" or "averaged" may refer to, for example, ratings that are calculated together. Note that the term "averaged" is sometimes referred to as "calculated together." For example, topics that become unified may be summarized. That is, when one of them is shown as a child topic, the calculations that determine its rating, popularity, description values, etc. may be averaged with the topics that are summarized with it. When one of them is shown as the main presented topic, all of the children connected to the other summarized topics may be shown as his child topics. As used herein, the term "coupled" may refer to, for example, children of unified topics. Such topics may be shown together for one of the unified topics and similar topics that are coupled may become unified.

As used herein, the phrases "selection field" and "constriction field" may refer to, for example, the three dimensions by which the system's data may be divided: "identical topics," "hierarchy relation," and/or "sphere/group." These may set the way the system is calculated, for example for deciding which child topics to display for the main presented topic, and with what values. Note that the term "identical topics level" is sometimes referred to as "singularity level".

They can be set automatically by the system differently for every topic, group, and/or sphere (and may also be changed by users). According to some embodiments, the default setting is: showing and calculating the direct child topics of all the unified topics with the main presented topic, in the current group/sphere.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system, comprising:
an accumulated information data store, including:
a plurality of topic nodes, each topic node having a text description of limited length and at least some of the topic nodes being associated with one or more attributes,
wherein a particular topic node is associated as a parent topic node to one or more other child topic nodes such that the topic nodes in the accumulated information data store form at least one data tree; and
an information processing engine, comprising:
a computer processor; and
a memory storage device including instructions that when executed by the computer processor enable the system to:
(i) access information in the accumulated information data store,
(ii) determine that a plurality of topic node text descriptions are similar and classifying them as similar topic nodes,
(iii) select at least a part of the text description associated with one of the similar topic nodes as a favorable text description for the similar topic nodes,
(iv) automatically identify all other topic nodes in the accumulated information data store that have the same text description as one of the similar topic nodes and merge all of the other identified topic nodes with the similar topic nodes, wherein the similar topic nodes and all of the other identified topic nodes are now classified as similar to each other and retain their associated attributes,
(v) unify the similar topic nodes as identical topic nodes when they are currently grouped together as having the same upper tree hierarchy,
(vi) classify the unified topic nodes that are also similar topic nodes as a single topic node represented by the favorable text description, wherein any attribute associated with the unified topic nodes is automatically mathematically combined,
(vii) determine that a plurality of topic nodes which are not similar, but have text descriptions that, when combined with each of their upper tree hierarchy's text descriptions, form a similar combination, comprise identical topic nodes,
(viii) unify the non-similar identical topic nodes,
(ix) as a result of unification, any attribute of the non-similar, identical topic nodes is automatically mathematically combined, and
(x) as a result of unification of both similar and non-similar topic nodes, couple together all child topic nodes of identical topic nodes to become child topic nodes of each of the identical topic nodes, wherein coupled child topic nodes that are similar are also unified.

2. The system of claim 1, wherein at least some of the attributes are associated with at least one of: (i) a rating score reflecting an importance of a topic node, (ii) a description field having pre-determined values that describe an aspect of a topic node, (iii) a popularity value, and (iv) a date value.

3. The system of claim 1, wherein the mathematical combination of attributes for unified topic nodes is associated with at least one of: (i) an averaging process, (ii) a summing process, (iii) a selection of a minimum value, (iv) a selection of a maximum value, (v) a selection of an earliest date, and (vi) a selection of a latest date.

4. The system of claim 1, wherein the information processing engine is further programmed to automatically determine unification of similar topic nodes with the same upper tree hierarchy when each of the parent lines of the similar topic nodes are similar until: (i) a shared parent node is reached, (ii) identical parent nodes are reached, or (iii) the head of each tree is reached.

5. The system of claim 1, wherein: (1) the determination that the text descriptions of the similar topic nodes are similar is performed automatically by the information processing engine, and (2) the determination that topic nodes have text descriptions that, when combined with each of their upper tree hierarchy's text descriptions, form a similar combination and comprise identical topic nodes is performed automatically by the information processing engine.

6. The system of claim 1, wherein the information processing engine is further programmed to classify information about children of the child topic nodes of a certain parent topic node down a number of levels as if they were the direct child topic nodes meaning the immediate children of the same upper tree hierarchy.

7. The system of claim 1, wherein the information processing engine is further programmed to classify information about child topics of similar but not identical topic nodes to a certain parent topic node, as if they were the parent topic node's child topic nodes, temporarily making these children coupled with the current parent topic's children.

8. The system of claim 1, wherein a set of topic nodes are related to a sphere of information in which all topic nodes and processes performed on topic nodes that exist or occur inside that sphere are not applied outside the sphere, including mathematical combinations and identifications of identical topic nodes, similar text descriptions, and coupled topic nodes.

9. The system of claim 8, wherein at least some spheres are arranged hierarchically, in a way that an upper more general sphere includes all of the information of lower, more specific spheres.

10. The system of claim 9, wherein the information processing engine is further programmed to perform a search of certain text within at least one sphere and the results are topic nodes within that sphere with text descriptions which were determined as similar in at least some part to a part of the searched text in the accumulated information data store, or the results are topic nodes with which the combination of their text descriptions and the text descriptions of their parent topic nodes resembles at least some part to a part of the searched text or is defined as similar to it or part of it in the accumulated information data store.

11. The system of claim 9, further comprising:
a user interface platform programmed to:
(i) receive from a user a selection of a topic node as a current topic node of interest,
(ii) display to the user information about the current topic node of interest, including information about the child topic nodes of the current topic node of interest,
wherein the child topic nodes are summarized: (1) first by similarity between child topic nodes which are reduced in amount and represented by favorable text descriptions, with mathematically combined attributes, and (2) second by the unification of identical topic nodes to the current topic node of interest which increases the amount of child topic nodes being displayed by the coupling process.

12. The system of claim 11, wherein: (1) the determination that text descriptions of the similar topic nodes are similar is based at least in part on information received via the user interface platform, and (2) the determination that topic nodes have text descriptions that when combined with each of their upper tree hierarchy's text descriptions form a similar combination comprise identical topic nodes is based at least in part on information received via the user interface platform.

13. The system of claim 11, wherein the user interface platform is further programmed to:
(i) receive from the user information about a new topic node, including information relating the new topic node to at least one other topic node, including whether it is a parent topic node or a child topic node, and the information including a new text description and other attributes, if other attributes exist, such as a new rating score and new description field values,
wherein the information processing engine is further programmed to add the new topic node to the accumulated information data store as appropriate.

14. The system of claim 11, wherein the user interface platform is further programmed to:
(i) receive from the user information about an adjustment to a topic node, including an adjusted text description, one or more adjusted attributes, such as an adjusted rating score, an adjusted description field, or information adjusting relationships between topic nodes, such as indicating that topic nodes are similar or identical,
wherein the information processing engine is further programmed to adjust the at least one data tree in the accumulated information data store as appropriate.

15. The system of claim 14, wherein the information about the adjustment is not propagated to accumulated information data stores associated with other users.

16. The system of claim 14, wherein a sphere of information is programmed to consist of information filled-in and changed by a group of users, and the information about the adjustment is propagated to accumulated information data stores associated within that group of other users comprising their own sphere.

17. A method, comprising:
storing, in an accumulated information data store, a plurality of topic nodes, each topic node having a text description of limited length and at least some of the topic nodes being associated with one or more attributes, wherein a particular topic node is associated as a parent topic node to one or more other child topic nodes such that the topic nodes in the accumulated information data store form at least one data tree;
accessing, by an information processing engine, information in the accumulated information data store;
determining that a plurality of topic node text descriptions are similar and classifying them as similar topic nodes;
selecting at least a part of the text description associated with one of the similar topic nodes as a favorable text description for the similar topic nodes;
automatically identifying all other topic nodes in the accumulated information data store that have the same text description as one of the similar topic nodes and merging all of the other identified topic nodes with the similar topic nodes, wherein the similar topic nodes and all of the other identified topic nodes are now classified as similar to each other and retain their associated attributes;
unifying the similar topic nodes as identical topic nodes when they are currently grouped together as having the same upper tree hierarchy;
classifying the unified topic nodes that are also similar topic nodes as a single topic node represented by the favorable text description, wherein any attribute associated with the unified topic nodes is automatically mathematically combined;
determining that a plurality of topic nodes which are not similar, but have text descriptions that, when combined with each of their upper tree hierarchy's text descriptions, form a similar combination, comprise identical topic nodes;
unifying the non-similar identical topic nodes,
as a result of unification, automatically mathematically combining any attribute of the non-similar, identical topic nodes; and
as a result of unification of both similar and non-similar topic nodes, coupling together all child topic nodes of identical topic nodes to become child topic nodes of each of the identical topic nodes, wherein coupled child topic nodes that are similar are also unified.

18. The method of claim 17, further comprising
determining that a plurality of topic nodes which are not similar, but have text descriptions that, when combined with each of their upper tree hierarchy's text descriptions, form a similar combination, comprise identical topic nodes;
unifying the non-similar identical topic nodes;
as a result of unification, automatically mathematically combining any attributes of the non-similar, identical topic nodes; and
as a result of unification of both similar and non-similar topic nodes, coupling together all child topic nodes of identical topic nodes to become child topic nodes of each of the identical topic nodes, wherein coupled child topic nodes that are similar are also unified.

19. A non-transitory computer readable medium storing instructions that, when executed by a computer processor, cause the processor to perform a method, the method comprising:
storing, in an accumulated information data store, a plurality of topic nodes, each topic node having a text description of limited length and at least some of the topic nodes being associated with one or more attributes, wherein a particular topic node is associated as a parent topic node to one or more other child topic nodes such that the topic nodes in the accumulated information data store form at least one data tree;
accessing, by an information processing engine, information in the accumulated information data store;

determining that a plurality of topic node text descriptions are similar and classifying them as similar topic nodes;

selecting at least a part of the text description associated with one of the similar topic nodes as a favorable text description for the similar topic nodes;

automatically identifying all other topic nodes in the accumulated information data store that have the same text description as one of the similar topic nodes and merging all of the other identified topic nodes with the similar topic nodes, wherein the similar topic nodes and all of the other identified topic nodes are now classified as similar to each other and retain their associated attributes;

unifying the similar topic nodes as identical topic nodes when they are currently grouped together as having the same upper tree hierarchy;

classifying the unified topic nodes that are also similar topic nodes as a single topic node represented by the favorable text description, wherein any attribute associated with the unified topic nodes is automatically mathematically combined;

determining that a plurality of topic nodes which are not similar, but have text descriptions that, when combined with each of their upper tree hierarchy's text descriptions, form a similar combination, comprise identical topic nodes;

unifying the non-similar identical topic nodes, as a result of unification, automatically mathematically combining any attribute of the non-similar, identical topic nodes; and as a result of unification of both similar and non-similar topic nodes, coupling together all child topic nodes of identical topic nodes to become child topic nodes of each of the identical topic nodes, wherein coupled child topic nodes that are similar are also unified.

* * * * *